(12) United States Patent
Takatori

(10) Patent No.: US 10,152,178 B2
(45) Date of Patent: Dec. 11, 2018

(54) PIEZOELECTRIC SHEET, TOUCH PANEL USING THE SAME, AND INPUT-OUTPUT DEVICE USING THEM

(71) Applicant: NLT Technologies, Ltd., Kanagawa (JP)

(72) Inventor: Kenichi Takatori, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 14 days.

(21) Appl. No.: 14/539,383

(22) Filed: Nov. 12, 2014

(65) Prior Publication Data

US 2015/0130770 A1 May 14, 2015

(30) Foreign Application Priority Data

Nov. 11, 2013 (JP) ................................. 2013-233566
Aug. 8, 2014 (JP) ................................. 2014-162582

(51) Int. Cl.
*G06F 3/043* (2006.01)
*G09G 3/36* (2006.01)
(Continued)

(52) U.S. Cl.
CPC .............. *G06F 3/043* (2013.01); *G06F 3/016* (2013.01); *G06F 3/044* (2013.01); *G06F 3/0418* (2013.01);
(Continued)

(58) Field of Classification Search
None
See application file for complete search history.

(56) References Cited

U.S. PATENT DOCUMENTS

2003/0234769 A1  12/2003 Cross et al.
2011/0043454 A1   2/2011 Modarres et al.
(Continued)

FOREIGN PATENT DOCUMENTS

JP  2006-107140  4/2006
JP  2007-065798  3/2007
(Continued)

OTHER PUBLICATIONS

Japanese Office Action for Application No. 2014-162582, dated May 8, 2018, with English Translation provided.

*Primary Examiner* — David D Davis
(74) *Attorney, Agent, or Firm* — Young & Thompson

(57) ABSTRACT

Disclosed is an active matrix liquid crystal display device with transverse electric field system, which improves afterimage. One electrode of many pixel comb electrodes is thicker in width than the other pixel comb electrode and common comb electrodes and is equal to a width of the common shield electrode covering through a second insulator film on video signal wirings. The display area is divided into two sub areas by the thick pixel comb electrode. The pixel comb electrode and the common comb electrode have the same number in each sub area. As the common shield electrode and the thick pixel comb electrode have the same width, the concentration of electric field can be eased near the pixel comb electrodes. The electric potential distribution becomes symmetric by symmetric configuration, reducing asymmetric lighting mode between frames. DC offset of the video signal after flicker adjustment decreases and the afterimage improves.

20 Claims, 40 Drawing Sheets

(51) Int. Cl.
  *G06F 3/044*   (2006.01)
  *G06F 3/01*    (2006.01)
  *G06F 3/041*   (2006.01)

(52) U.S. Cl.
  CPC . *G09G 3/3696* (2013.01); *G06F 2203/04106* (2013.01)

(56) References Cited

U.S. PATENT DOCUMENTS

| | | | |
|---|---|---|---|
| 2011/0069024 A1* | 3/2011 | Kim ............................. | 345/173 |
| 2012/0007614 A1  | 1/2012 | Yeh et al. | |
| 2012/0075221 A1* | 3/2012 | Yasuda ....................... | 345/173 |
| 2013/0027340 A1* | 1/2013 | Kodani et al. ............... | 345/173 |
| 2013/0181951 A1* | 7/2013 | Klinghult et al. ............ | 345/177 |
| 2014/0063525 A1* | 3/2014 | Kawaoka ..................... | 358/1.13 |
| 2014/0152618 A1* | 6/2014 | Ando ............................ | 345/174 |
| 2014/0354905 A1* | 12/2014 | Kitchens et al. ............. | 349/12 |
| 2015/0042590 A1* | 2/2015 | Ando et al. .................. | 345/173 |

FOREIGN PATENT DOCUMENTS

| | | |
|---|---|---|
| JP | 2010-108490 | 5/2010 |
| JP | 2011-210081 | 10/2011 |
| WO | WO 2010/106759 | 9/2010 |

\* cited by examiner

PIEZOELECTRIC SHEET, TOUCH PANEL USING THE SAME, AND INPUT-OUTPUT DEVICE USING THEM

FIELD OF THE INVENTION

The present invention relates to a piezoelectric sheet. In particular, it relates to a piezoelectric sheet being possible for a touch position detection and a touch pressure detection. Moreover, it relates to an input-output device using their piezoelectric sheets or a touch panel.

BACKGROUND ART

A display and input-output device providing or combining the touch screen (may be called as a touch panel), which is an input device, has been widely put in practical use as a display device such as a liquid-crystal display. In particular, a display and an input device are mainly used in a portable device such as cellular phone. A display and an input device with this touch screen are possible for users to operate devices intuitively by pushing on screen of display device.

Although there are various systems in the touch screen, a capacitive system is gradually increasing recently. The projected capacitive system having electrodes performed by a lot of patterning in x direction and y direction among the capacitive system is easy to detect multi-points touch and widespread rapidly recently.

On the other hand, in case of a surface-capacitive type regarding a planar electrode without patterning as a detection surface among the capacitive systems, there are a lot of needs for use required for robustness. Different points from the other systems will be the followings, (1) Sensitivity is obtained by not digital signal, but analogue signal, as there is no patterning on the electrodes. (2) There more sensitive even with a small capacitance (3) There are few influences caused by water sticking in order to measure an absolute capacitance between grounds (human body) and a planar electrode (4) The similar structure is applicable to various sizes ranging from a small type to a large type (5) A simple structure is applicable (6) Visibility is so good, as there are few laminated layers and there is no patterning in a visible part.

Next, the background art concerning the piezoelectric sheet will be described.

Piezoelectric effect (Piezoelectricity) is a phenomenon of electrical polarization (electrical charge on surface) generated at the time of affecting mechanical strain to a substance. The generated electric potential is proportional to a magnitude of strain and the polarity corresponds to a direction of strain. This phenomenon is reversible. When the same substance is electrically polarized by applying electric field to it, mechanical strain generates, or transforms the substance in proportion with a magnitude of the polarization.

There is a pyroelectric effect as a phenomenon similar to the piezoelectric effect. The pyroelectric effect (Pyroelectricity) is a phenomenon of electric polarization caused by the heat absorption in the substance. The generated electric charge is proportional to a magnitude of temperature change. All of the pyroelectric substance having Pyroelectricity shows the piezoelectricity.

On the other hand, some of piezoelectric substance having the piezoelectric effect does not have the pyroelectric effect.

As the material with the piezoelectricity, ceramics represented by PZT (lead zirconate titanate: $Pb[Zr_xTi1-x]O_3$) are greatly used. As there is a problem of toxicity including lead in piezoelectric ceramics, a large number of lead-free piezoelectric ceramics such as Bismuth ferrite ($BiFeO_3$) has been developed. However, the ceramics has defects, in which it is not good at flexibility and machinability as its material is hard, and also it is hard to handle in a large area sheet.

On the other hand, the piezoelectric film using polymeric material has the following characteristics. It has flexibility (flexible and rich in elastic deformation), machinability (for example, easy to cut with scissors), shock resistance, high voltage resistance, water resistance, chemical stability, and the like, and also it is easy to make large area and thin film thereof. It has characteristics which are small in specific weight, light in weight, and a good transparency. Moreover, it has characteristics which have high voltage output, a wide range of frequency characteristics, low acoustic impedance, a large piezoelectric coefficient, and the like.

The polarized (poling) polyvinylidene fluoride (1, 1-2 ethane polymer fluoride, PVDF) of homopolymer represents a high piezoelectric property. Ceramics produces a piezoelectric effect by crystal structure of a material. On the other hand, PVDF is around 50% of semicrystalline polymer in crystallinity degree. As a long-chain molecules, which is mutually winding, are adhered to and detached in polymer, it shows behaviors which are different from piezoelectricity caused by a crystalline structure itself. Principally, PVDF is considered to generate the piezoelectric effect by two mechanisms. One is a piezoelectricity of a crystal caused by transforming dipole in the crystal by outside force, and the other is a piezoelectricity caused by scale effect, which shows a change of electric charges induced at electrodes by residual polarization, based on distortion of soft non-crystalline part.

The transparent piezoelectric sheet for detecting the pressure with use of polymer showing piezoelectricity described above is disclosed in Patent Literature 1.

Patent Literature 1 discloses a transparent piezoelectric sheet comprising a sheet-like transparent piezoelectric layer, a first transparent plate electrode disposed on one surface of the layer and a second transparent plate electrode disposed on the other surface of the layer. The transparent piezoelectric sheet is possible to detect the touch pressure and use as a transparent piezoelectric sheet for detecting the touch pressure. This transparent piezoelectric sheet for detecting the touch pressure gives a touch pressure detecting function on a touch panel for detecting the touch position by combining with the touch panel for detecting the touch position. This touch panel for detecting the touch position is designed to use a resistive-film touch panel which is low cost, or a projected capacitive touch panel which is easy to detect multi-points touch. With reference to FIG. 35 corresponding to FIG. 1 of Patent Literature 1, two transparent sheet members having the transparent plate electrodes 2122, 2123 on them are combined to face mutually the transparent plate electrodes 2122, 2123, and a sheet-like transparent piezoelectric layer 2121 is provided therebetween, under the touch panel 2210 of the resistive film or projected capacitive systems. The piezoelectric sheet 2120 is formed by the transparent plate electrodes 2122, 2123 and the sheet-like transparent piezoelectric layer 2121. The whole members are housed in the frame 2124. These configurations enable detections of both the touch position and the touch pressure.

On the other hand, Patent Literature 2 discloses a system detecting the touch position and the touch pressure by a touch panel for detecting the touch position of the projected capacitive system and the piezoelectric elements (pressure sensors) provided at four corners thereof.

Patent Literature 2 discloses a sensor device. FIG. 1 illustrating a Data Processing Unit with the sensor device of Patent Literature 2 will be referred as corresponding to FIG. 36. The sensor device is composed by a touch panel 2250, a housing 2210, and a pressure sensor 2260. The touch panel is applied as a capacitive system or a resistive film system. The touch panel of the capacitive system in Patent Literature 2 is, for example, configured to laminate a X electrode substrate and a Y electrode substrate to form a X transparent electrode pattern on the X electrode substrate and Y transparent electrode pattern on the Y electrode substrate, respectively. That is, the touch panel of capacitive system in Patent Literature 2 is the touch panel of projected capacitive system.

The pressure sensor 2260 has a first electrode fixed to the touch panel 2250, a second electrode fixed to a housing 2210, and an elastic body disposed between the touch panel and the housing. The pressure force pushed on an input operation surface is detected as a change of capacitance between the first electrode and the second electrode. This pressure sensor is disposed at four corners of the touch panel.

Moreover, the liquid-crystal panel 2230 is disposed at a rear surface of the touch panel 2250. The liquid-crystal panel 2230, the touch panel 2250, and the pressure sensor 2260 are stored in the housing 2210.

PRIOR ART LITERATURES

Patent Literatures

[Patent Literature 1]
Japanese Patent Laid-open Publication No. 2010-108490 FIG. 1 to FIG. 4 and Line 32 of Page 6 to Line 20 of Page 8
[Patent Literature 2]
International Patent Publication No. WO2010/106759.A1

SUMMARY OF THE INVENTION

Problems to be Solved by the Invention

A first problem of conventional inventions is that the touch panel for detecting the touch position is complicated in structure as the touch panel for detecting the touch position is configured to apply resistive film system or projected capacitive system as a touch panel for detecting the touch position. At least two layers of electrode layers are required for the resistive film system or projected capacitive system. Members in structure are required between the electrodes by the resistive film system, and patterning is required for each of the electrodes by the projected capacitive system. Moreover, it is required for connections between each electrode piece divided by the patterning and signal & detection sources of the outside in the projected capacitive system. As it is complicated in structure, it increases costs, and as there are so many kinds and amounts of use materials, it is not preferable in view of environmental aspect.

A second problem is that visibility is not good at the time of combining with display or the like. The reason is that at least two sets of transparent electrodes are required for each of the detections of the touch position and the touch pressure by Patent Literature 1. A plurality of layers is required for the detection of the touch position by Patent Literatures 1 and 2. When the electrode layers are increased in number and the structured layers are increased in number, a transmittance decreases by the absorption or the like at each layer. As the number of the structured layers increases, the visibility decreases by a decrease of bright point contrast caused by reflections at boundary surface between the layers.

In Patent Literature 2, there is a gap 2295 between the liquid-crystal panel 2230 and the touch panel 2250. Consequently, the visibility further decreases as the boundary surface reflection is increased by the gap.

A third problem is a complicated structure that the first electrode provided in the touch panel and the second electrode provided in the housing is required at the time of constituting the pressure sensor for detecting the touch pressure by Patent Literature 2. It is also complicated in structure, as an elastic body is required between the electrodes. As the specific fixing structure, which has not been seen in conventional touch panel or display, is required for fixing the pressure sensor, it is time-consuming to manufacture, it increases in cost, and it is weak in mechanical strength against vibration or shock.

A fourth problem is that it becomes large in weight and volume in size of the touch panel because of a lot of component parts in Patent Literatures 1 and 2. Heavy weight prevents portability in portable type and the prescribed strength is required for the support thereof even in non-portable type. As the volume is large, it increases in thickness or frame portions of the touch panel other than the detection surface of the touch pressure are increased in area. As a result, it prevents portability and increases in area and volume for installation.

The conventional art does not disclose a touch panel technology for detecting the touch position and the touch pressure by using a transparent piezoelectric sheet and a surface capacitive system. Even in conventional case of a combination of the transparent piezoelectric sheet and the surface capacitive system, two layers of a conductive layer and a piezoelectric layer are required for constituting the transparent piezoelectric sheet and one conductive layer is required for a surface-capacitive touch panel. In addition, the insulating layer or gap is required to prevent short circuit between one of the conductive layers[K1] of the transparent piezoelectric sheet and the conductive layer of the surface-capacitive touch panel[K2]. In result, it is complicated in structure, it increases in cost, and number of parts is increased, even if it uses the surface capacitive system, which has simpler structure compared with the resistive-film system or the projected capacitive system. Moreover, the surface capacitive system is configured to detect the capacitance with the touched finger, such that conductive layer of the surface capacitive system need to be put on an upper portion, which is close to fingers, and transparent piezoelectric sheet be put on an lower layer. The surface capacitive system is realized only by the above configuration. For accurate detections of the touch pressure by the transparent piezoelectric sheet, the touch pressure cannot be detected without flexibility to transform the touch panel of the surface capacitive system and the insulating layer or gap on a lower layer thereof according to the touch pressure. Such a configuration means that not the touch panel of the existing surface capacitive system, but the specifically designed touch panel of the surface capacitive system is required. Consequently, this will be a factor for increasing the cost.

Then, as a combination of the existing transparent piezoelectric sheet and the surface-capacitive touch panel has problems such as cost and performance, it is difficult to realize it. Both the touch position and the touch pressure cannot be detected in prior art of the surface-capacitive touch panel.

As above mentioned, a first object of the present invention is to provide a piezoelectric sheet detecting the touch position and the touch pressure (pressing force) in a simple structure for solution of the above problems. As the structure is simple, the present invention can be made to be thin and light in weight, compared with the conventional one and provide a low-cost piezoelectric sheet. Furthermore, it provides a piezoelectric sheet, which is mechanically strong in vibration and outside pressure and has high performance in reliability and robustness by a simple structure.

A second object of the present invention is to provide a piezoelectric sheet which the touch position and the touch pressure (pressing force) can be detected and the visibility can be extremely good in combination with a display or the like. Furthermore, an object of the present invention is to provide a piezoelectric sheet, which is high in luminous transmittance and low in reduction in the quantity of light, and achieves low power consumption or high luminance.

A third object of the present invention is to provide a piezoelectric sheet detecting bending and torsion at the time of bending and twisting a sheet in addition to detections of the touch position and the touch pressure.

A fourth object of the present invention is to provide a piezoelectric sheet, which the feedback and feeling caused by vibration can be obtained in addition to detections of the touch position and the touch pressure. This gives the vibration feedback relating to the touch at the time of touching to fingers or the like. The feedback is also given as a sound by regulating the vibration frequency. On the other hand, it induces a touch feeling of materials by vibration conditions at the time of touching and vibration changes before and after the touch.

A fifth object of the present invention is to provide a piezoelectric sheet, which detects mainly the touch position by the surface-capacitive system and is possible to detect the touch position even in case of non-conductive pen (non-conductive stylus).

A sixth object of the present invention is to provide a touch panel using a piezoelectric sheet to achieve an object of the first to fifth objects and an input-output device using their piezoelectric sheets or touch panels.

Means for Solving the Problem

In order to solve the above problems, a first means of the present invention is a piezoelectric sheet, comprises a piezoelectric layer, a first conductive layer disposed on one surface of the piezoelectric layer, a second conductive layer disposed on the other surface, and an insulating layer disposed on the first conductive layer. Then, the first means of the present invention is a piezoelectric sheet designed to detect a touch position in the first conductive layer and touch pressure by the second conductive layer.

The first conductive layer on one surface and the second conductive layer on the other surface of the piezoelectric layer enable the strain occurred in the piezoelectric layer caused by the outside force to extract as an electric signal from the first conductive layer or the second conductive layer. In this example of the present invention, the second layer is able to detect the touch pressure as electric signal caused by the strain. On the other hand, the first conductive layer is possible to detect the touch position by working as a surface of the conductive film of the surface capacitive system. Conventionally, it is well known that it is possible to detect the touch position on the surface-capacitive touch panel by one-layer conductive film surface and the insulating layer placed thereon.

Specifically, the touched position on the surface can be detected by applying, for example, a sine wave electric signal on the first conductive layer and monitoring the deviation of amplitude of the sine wave electric signal depending on the touch position on the surface position parallel to the piezoelectric sheet. The second conductive layer is normally fixed to a specific voltage or synchronized with a specific another waveform (for example, sine wave applied to the first conductive layer). As a result, the second conductive layer functions as a shield layer, which reduces the influence of the radiation noise etc. from the other signal source on the detection of position. On the other hand, when the pressure is applied, the strain occurs in the piezoelectric layer between the first conductive layer and the second conductive layer and electric waveform are observed corresponding to the change of the pressure. As this waveform shows the time-amplitude form different from the sine wave applied to the first conductive layer and the specific voltage and waveform applied to the second conductive layer, it can be easily separated from the applied waveforms.

The present means is designed to use the first conductive layer as a conductive layer film of the surface-capacitive touch panel and as a reference potential surface in detecting strain occurred in the piezoelectric substance at the second conductive layer. The reason why this application is possible is that the waveforms applied to each conductive layer and the waveform obtained by the pressure can be easily separated. The pressure can be detected by separating the waveform obtained by the pressure from signals obtained by monitoring the voltage of the second conductive layer. On the other hand, it is possible to detect the pressure based on the separation of signals in the first conductive layer. However, it is preferable that signals of touch pressure are removed from signals observed in the first conductive layer by the filter. The reason is that the precision of touch position detected in the first conductive layer is prioritized.

As the other detection system of signals based on the touch pressure, there is a detection system to shift the period and time applying signals for detecting the touch position. That is, this is a detection system driven by time sharing. Although the drive according to this system becomes a little complicated, it is easy to catch the detection signals as signals can be separated on the time axis.

The present means is provided, as needed, with an applying means for applying voltage waveform in the first conductive layer, an applying means for applying voltage waveform in the second conductive layer, a detection means for detecting an electric current flowing in the first conductive layer, a detection means for detecting voltage in the second conductive layer, and the like. For these applying means and detection means, it is possible to use the element playing a role of many means as one means. For example, it may be integrated as one IC.

A second means of the present invention is a piezoelectric sheet, comprises a first conductive layer disposed on one surface of the piezoelectric layer, a second conductive layer displaced on the other surface, and an insulating layer displaced on the opposite surface of the piezoelectric layer of the first conductive layer, detecting a touch position on a surface of the first conductive layer and detecting the touch pressure by the first conductive layer.

The strains occurred in the piezoelectric layer by the outside force can be caught as electrical signals from the first and second conductive layers by providing the first conductive layer on one surface of the piezoelectric layer and the second conductive layer on the other surface of the piezoelectric layer. The present invention is designed to detect pressure by detecting electrical signals caused by the strains in the first conductive layer. Furthermore, the first conductive layer is possible to detect position by performing as the conductive film surface of the surface capacitive system. It is well known that the touch position can be detected on the surface-capacitive touch panel by the conductive film surface made from one layer and the insulating layer disposed thereon.

As above mentioned, the first conductive layer is able to detect the touch position by acting as the conductive film surface of the—surface-capacitive system and detect the touch pressure by acting as the conductive film surface for the voltage change monitor of the piezoelectric layer. This system is configured to perform only the drive of the piezoelectric layer without detection of electric current and voltage in the second conductive layer. That is, the second conductive layer is possible to fix to the specific voltage and the specific waveform.

As a result, in case of a combining a piezoelectric sheet of the present invention with an display device, the second conductive layer is possible to act as a shield surface at the same time and is hardly affected by the influences such as radiation noise received from the display device. As the second conductive layer is used only for drive in this configuration, this shield effect can be ordinarily obtained. On the other hand, as the touch position and the touch pressure are detected only by the first conductive layer, the first conductive layer is driven by time sharing. Consequently, a system for detecting the touch position and the touch pressure is configured to be detected by the time difference.

This means is provided, as needed, with an applying means applying the voltage waveform in the first conductive layer, an applying means for applying the voltage waveform in the second conductive layer, a detection means of electric current flowing through the first conductive layer, a detection means of voltage in the first conductive layer, and the like. These applying means and detection means are possible to use elements acting as a plurality of means as one means. For example, it may be integrated as one IC.

A third means of the present invention is an input-output device piezoelectric sheet, which comprises a first conductive layer disposed on one surface of the piezoelectric layer, a second conductive layer disposed on the other surface, and an insulating layer disposed on the opposite surface of the piezoelectric layer of the first conductive layer, and is characterized to have a signal applying means for applying signals detecting the position on the surface of the first conductive layer and a signal applying means for applying superposed signals of vibration generation signals in the detection signals of the position on the surface of the second conductive layer.

The first conductive layer is configured to apply the drive signal for detection of the touch position and detect signals relating to the touch position. On the other hand, the piezoelectric layer is designed to vibrate by the superposed signals of the vibration generation signals applied to the second conductive layer. This vibration is possible to reveal various feelings of touch to a touched user by the frequency and strength. That is, so-called tactile sensation feedback (tactile feedback).

A fourth means of the present invention is a touch panel, which comprises a first conductive layer disposed on one surface of the piezoelectric layer, a second conductive layer performed by patterning in stripes form disposed on the other surface, and an insulating layer disposed on the opposite surface of the piezoelectric layer of the first conductive layer, and is characterized to have a signal applying means for applying signals detecting the position on the surface of the first conductive layer and a measurement means for measuring the voltage at both ends of the second conductive layer performed by patterning.

It is configured to be possible to detect the touch position according to the same principle as the surface-capacitive touch panel in the first conductive layer. On the other hand, it is possible to detect the touch pressure in the second conductive layer. In this case, as the second conductive layer is performed by patterning in stripes, in the direction orthogonal to the longitudinal direction of the stripes, depending on the touched position, the touch pressure cannot be detected or it gives rise to the considerably difference in the detected touch pressures. As a result, it is possible to detect the touch position as a difference of the touch pressure in relation to the direction orthogonal to the longitudinal direction of the stripes. The second conductive layer is configured to measure voltage at both ends of each region performed by patterning in stripes. The electric charges generated by the touch pressure give a rise to a distribution corresponding to the position according to the touched position in each region in stripes in the longitudinal direction of the stripes. It is possible to detect the touch position in the longitudinal direction of the stripes according to the difference between voltages at both ends by measuring voltage at both ends of each region of the stripes. As a result, it is possible to detect the touch position generating the touch pressure on two-dimensional surface in the two conductive layers. Conventionally, the touch caused by a pen can be detected only in case of the specific pen having conductivity and fixing the ground electrical potential in case of touching the surface of surface-capacitive touch panel with pen. The detection precision could be decreased in case of an extremely small electrostatic change at the time of wearing the extremely thick gloves on the hands. This configuration is possible to detect the touch position as a difference of the touch pressure positions by the touch with a normal or not-specific pen or by the touch with extremely thick gloves worn as the touch position is able to be detected by the detection of the difference of the touch pressures.

A fifth means of the present invention is an input-output device piezoelectric sheet, which comprises a first conductive layer disposed on one surface of the piezoelectric layer, a second conductive layer disposed on the other surface of the piezoelectric layer, and an insulating layer disposed on the opposite surface of the piezoelectric layer of the first conductive layer, and a signal applying means applying the signals to detect the position on the surface of the first conductive layer, an acoustic generation signal generating means for driving the piezoelectric layer and generating a sound by applying signals between the first conductive layer and the second conductive layer to generate sounds.

The acoustic generation signals may be superposed with the other signals. It is configured to reveal a feedback of various sounds to users by regulating frequency and strength of signals. A change of voltage applied to the piezoelectric layer is able to transform to a change of strain and force of the substance. As a result, sounds can be generated as a result of change of strain and force of the substance.

A sixth means of the present invention is a piezoelectric sheet, which comprises a first conductive layer disposed on one surface of the piezoelectric layer, a second conductive layer disposed on the other surface of the piezoelectric layer, a third conductive layer disposed on the opposite side of the first conductive layer at the predetermined intervals from the second conductive layer, and an insulating layer disposed on one surface of the first conductive layer where the piezoelectric layer is disposed on the other surface, and detects the position on the surface of the first conductive layer and the pressure in the second conductive layer.

This is configured to use in order to be hardly affected by influences such as the radiation noise from a lower surface of the piezoelectric sheet. For example, it is designed in order not to be affected by influences such as radiation noise from the other devices disposed on the lower surface when combined the other devices such as a display device on the lower surface of the piezoelectric sheet. One example of this configuration is designed to apply signals detecting the position on the surface of the first conductive layer and apply to the third conductive layer the same signals as the signals applied to the first conductive layer. Then, the third conductive layer functions as a shield surface against radiation noise or the like from the lower surface. Under no touch pressure, the second conductive layer is configured to stabilize in the electrical potential described based on the capacitance coupling between the first conductive layer and the third conductive layer. The electrical potential is ideally the same between the first conductive layer and the third conductive layer. On the other hand, the second conductive layer is different in electrical potential from the first conductive layer in a state of generating the touch pressure. As a result, the touch pressure can be detected from the second conductive layer. This is configured to reduce the influences such as radiation noise instead of increasing the number of conductive layers compare with the other configurations and the position precision and the touch pressure can be detected with high precision because of easy signal separation.

Effects of the Invention

As above mentioned, various effects can be obtained by carrying out the present invention. A first effect is that the present invention is a simple structure comprising two layers of the conductive layers, a piezoelectric layer provided therebetween, and the insulating layer provides a piezoelectric sheet detecting both the touch position and the touch pressure at low cost.

The reason is that a principle of the surface-capacitive touch panel is applied for detecting the touch position, only one layer of the conductive layers for detecting the touch position is used, and one of two conductive layers required for detecting the touch pressure is also used as the conductive layer for detecting the touch position. Related Art of Patent Literature 1 or the like is required for four conductive layers which are two layers in the conductive layers for detecting the touch position and two layers in the conductive layers for detecting the touch pressure. The conductive layers according to the present invention are required for only two layers, that is, the present invention reduces the number of conductive layers by half. Consequently, the present invention also reduces the number of the other layers such as insulating layers required between the conductive layers.

A second effect is to improve the visibility.

The reason is that the reflection between layers decreases by reducing extremely the number of structure layers as described in the first effect. Then, it is possible to increase the transmittance, to prevent a double image caused by the interface reflection between layers, to prevent a parallax, that is, a deviation between display and the touch position, and to prevent the decrease of bright point contrast. Furthermore, as conventional patterning electrode layers made from two layers for the X and Y directions are not required, the pattern performed by patterning cannot be seen. Consequently, it is not required for the refractive index adjustment layer, used often in the projected capacitive system, to make patterns of the patterning electrode inconspicuous.

A third effect has new functions like a tactile sensation [K3] and a sound without adding new other parts, and can realize the other new feedbacks like a tactile sensation and a sound.

The reason is that it superposes signals relating to the tactile sensation and the sound to signals applied to the piezoelectric layer. The piezoelectric layer is configured to detect the touch pressure by generating electricity corresponding to the touch pressure. Conversely, the piezoelectric layer is configured to generate the tactile sensation and sound by generating the transform corresponding to electricity applied.

A fourth effect is that the touch position can be detected by the touch panel of the surface-capacitive system even in case of the touch of fingers or non-conductive substance.

The reason is that the pressure position in Y direction can be detected by the patterning in stripes of the second conductive layer and the pressure position in X direction can be detected by monitoring voltage at both ends of the stripe. This effect enables to use various means such as touch through thick gloves or plastics stylus as touch means.

A fifth effect is that the piezoelectric sheet with touch panel function, which is simple in structure, but strong against outside noise, can be obtained.

The reason is that the first conductive layer is not affected by the influence such as radiation noise received from display device etc. because the second or third conductive layer functions as a role of shield surface.

A sixth effect is that a piezoelectric sheet possible to detect bending or torsion in case of bending or twisting the whole piezoelectric sheet can be obtained in addition to the position detection.

The reason is that the above present invention is simple in structure, compared with the related arts, and also configured to use flexible material or material, which is able to follow the flexible material to some extent, as the constituent material of invention. Consequently, it can provide a measurement element of a stress distribution or a load distribution without adding new parts. The piezoelectric sheet can be manufactured effectively for the detection of bending or torsion, as the piezoelectric power can select a direction to be detected. In particularly, it is not affected by the influence of temperature change by using material having little pyroelectricity. Namely, when the pyroelectricity exists, the polarization generates by a change of temperature. Consequently, if the working temperature changes or it is warmed with a human hand, the characteristics deviates. On the other hand, when the pyroelectricity does not exist, it is not affected by a change of temperature. Then, it is possible to detect bending or torsion precisely.

BRIEF DESCRIPTION OF THE DRAWINGS

FIGS. 32A and 32B are views illustrating an intellectual toy in the example 5 of the present invention, in which FIG. 32A is a case of small sound volume (in plane) and FIG. 32B is a case of large sound volume (in case of having both ends).

MODES FOR CARRYING OUT THE INVENTION

Figure 1:
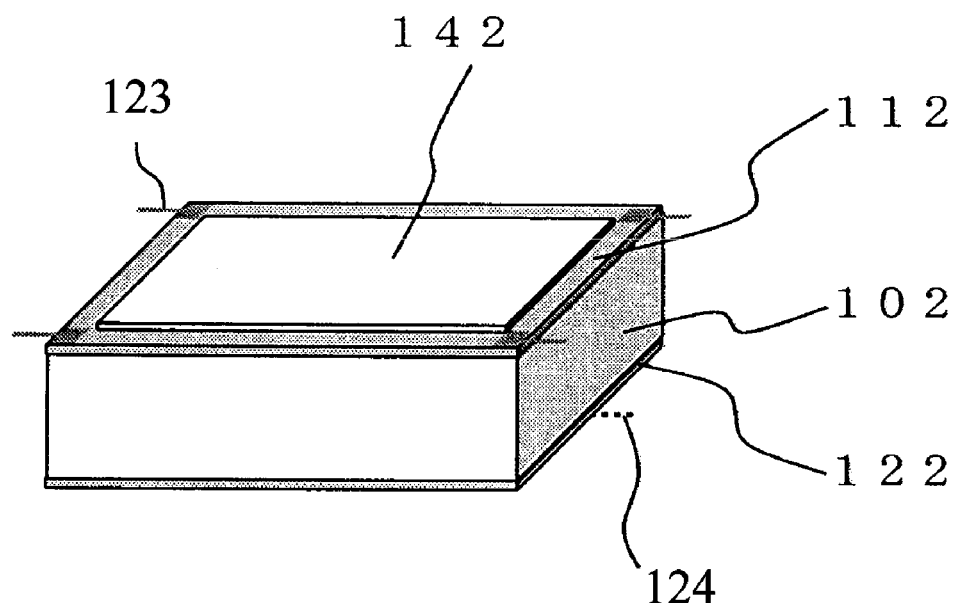
FIG. 1 is a perspective view illustrating a first embodiment.

Next, embodiments of the present invention will be described with reference to drawings. With reference to FIG. 1, which is a perspective view of an embodiment of the present invention, an embodiment of the present invention comprises a piezoelectric layer 102, a first conductive layer 112 disposed on one surface of the piezoelectric layer 102, a second conductive layer 122 disposed on the other surface of the piezoelectric layer 102, and an insulating layer 142 disposed on the opposite surface of the piezoelectric layer 102 of the first conductive layer 112. In other words, the insulating layer 142 is disposed on the first conductive layer 112.

Preferably, the piezoelectric layer 102 is applied as a transparent piezoelectric sheet at visible light region. According to the intended use, it is designed to apply a piezoelectric sheet having a transparent property at a wavelength region corresponding to a use without limiting the visible light region.

The embodiment of the present invention is designed to detect the touch position on a surface at the first conductive layer 112 and detect the touch pressure in the second conductive layer 122. FIG. 1 illustrates electrodes provided at four corners of the first conductive layer 112, a wiring connection 123 derived therefrom, as well as an electrode provided in the second conductive layer 122, and the wiring connection 124 for the second conductive layer derived therefrom as an example of an electrode disposed for detection. It may be electrically connected by the other means without using the wiring connection.

Each wiring connection derived from electrodes provided at four corners of the first conductive layer 112 in FIG. 1 is designed to apply, for example, AC signals to the first conductive layer. A difference of variation of current value caused by touch and touch position can be monitored by reading a change of the current flowing through the wiring connection. The voltage generated in the piezoelectric layer 102 by the touch pressure can be monitored with use of the wiring connection derived from the electrodes provided in the first conductive layer 112 and the second conductive layer 122. These configurations will be described in detail.

Figure 2:
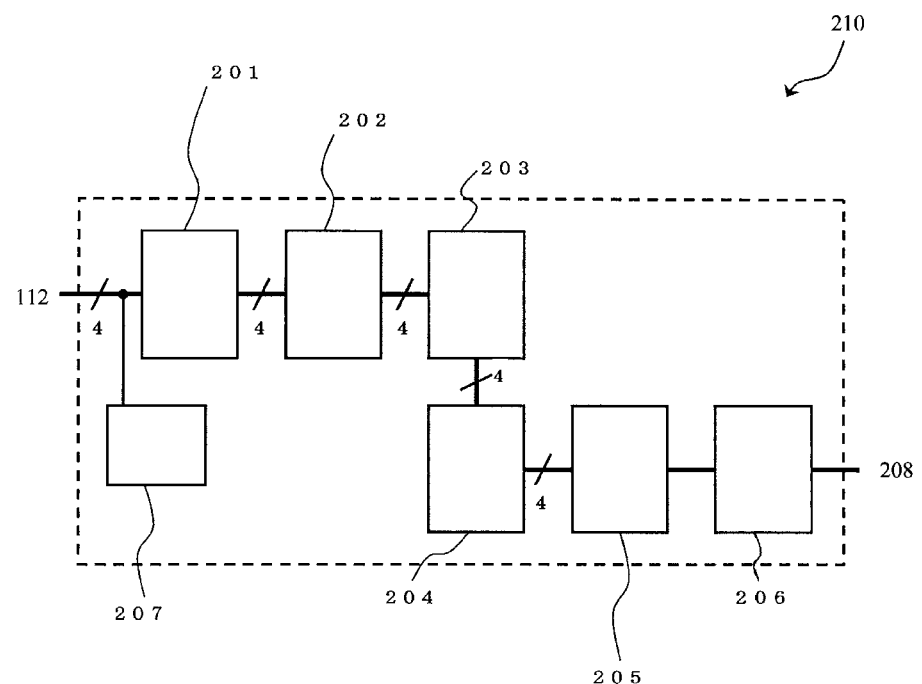
FIG. 2 is an example of block diagram of position detection and coordinates calculation IC used in the present invention.

FIG. 2 is an example of block diagram of position detection and coordinates calculation IC of the embodiments of the present invention.

The position detection and coordinates calculation IC 210 of the embodiment of the present invention is designed to apply the drive signals such as sine wave to the first conductive layer 112 through four wiring connections derived from the first conductive layer 112, and calculate the position coordinate by detecting a change of electric current flowing through four wiring connection derived from the first conductive layer 112.

Functions of block diagram in FIG. 2 will be specifically described. The position detection and coordinates calculation IC 210 in FIG. 2 is designed to treat signals of four wiring connections in parallel at the first stage of signal treatment and process analogue signals. Signals flowing through four wiring connections derived from the first conductive layer 112 driven by AC drive circuit (signal applying means) 207 generate in a new path flowing electric current to the virtual ground through human body by the touch. A current change detector 201 is designed to detect the current change by this touch and change to an easy way to process the detected signals by the next block.

Next, it filters feeble signals supplied from the current change detector 201 at a filtering and amplifier 202 and rectifies by amplifying them. The following noise eliminator 203 is designed to improve S/N ratio (signal-to-noise ratio) by eliminating noise elements. A/D converter 204 is designed to change analogue signals to digital signals and then process digital signals. The following position coordinates calculator 205 is designed to calculate the position coordinate based on the signal change by the touch obtained from signals of four wiring connections. The current variation volume observed through each electrode is different according to a distance between electrodes of four corners provided in the first conductive layer 112 and the touch position. Touch positions on the surface can be understood by using this current variation. This is the same as the other type of surface-capacitive system. The final interface driver 206 is designed to receive and deliver data or command from the following outside host 208.

Figure 3:
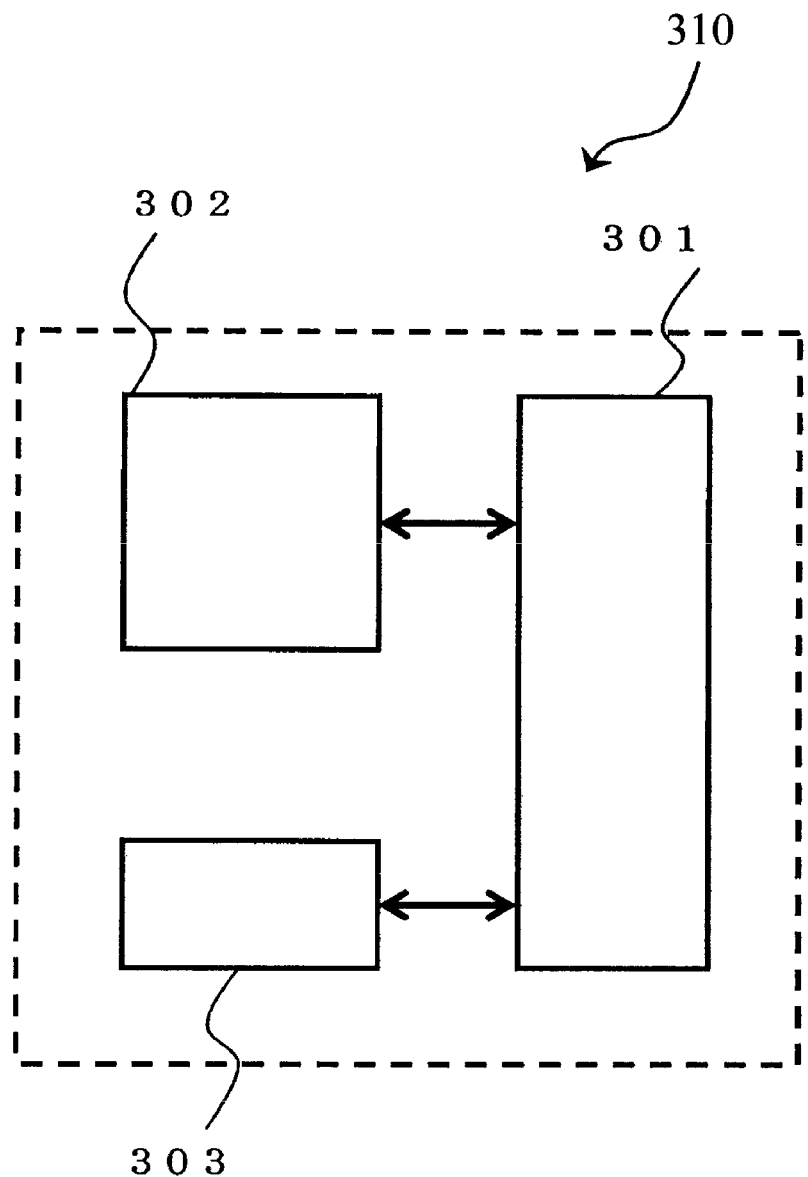
FIG. 3 is an example of block diagram of pressure detection IC used in the present invention.

FIG. 3 is an example of block diagram of pressure detection IC of the embodiment of the present invention. The pressure detection IC 310 is designed to detect the touch pressure sensed in the piezoelectric layer 102 and the two conductive layers 112, 122. The touch pressure detector 302 is connected to the wiring connection 124 for the second conductive layer in FIG. 1. The touch pressure detector 302 is designed to detect the touch pressure (pressing pressure) and judge whether the detected value is beyond the controlled value such as threshold value memorized in the memory 303 or not, and then designed to proceed the following function. As later described, voltage generated by the touch pressure is not strictly proportional to the touch pressure, but has an appropriately proportional relation.

The touch pressure detector 302 is possible to obtain the touch pressure based on the measured voltage change by previously obtaining this proportion coefficient. However, as a change of voltage caused by noise is detected as the touch pressure only by this simple proportion coefficient, the measured change of voltage is designed to generate the touch pressure in case of going beyond the threshold memorized previously in the memory 303. These are wholly controlled by a controller 301.

In addition, the touch pressure detector is configured to comprise a voltage monitor (measuring means) [K1] measuring voltage of the connected conductive layer and a voltage-to-touch pressure conversion part seeking the touch pressure based on voltage measured by the voltage monitor. As later described, the voltage-to-touch pressure conversion part is possible to be simple in structure for changing between the voltage measured based on an offset and proportion coefficient and the touch pressure, when the voltage and the touch pressure have approximately the proportional relation.

A configuration of the position detection—coordinates calculation IC and touch pressure detection IC described in the above is one example, and may be the other configuration. The configuration does not use IC, but it may be combined with the other circuit, or may be one IC integrating both ICs.

There are various systems as the detailed system for detecting the touch position and the touch pressure. The following describes one example of the time sharing system detecting with the time lag shifted between the touch position and the touch pressure.

Figure 4:
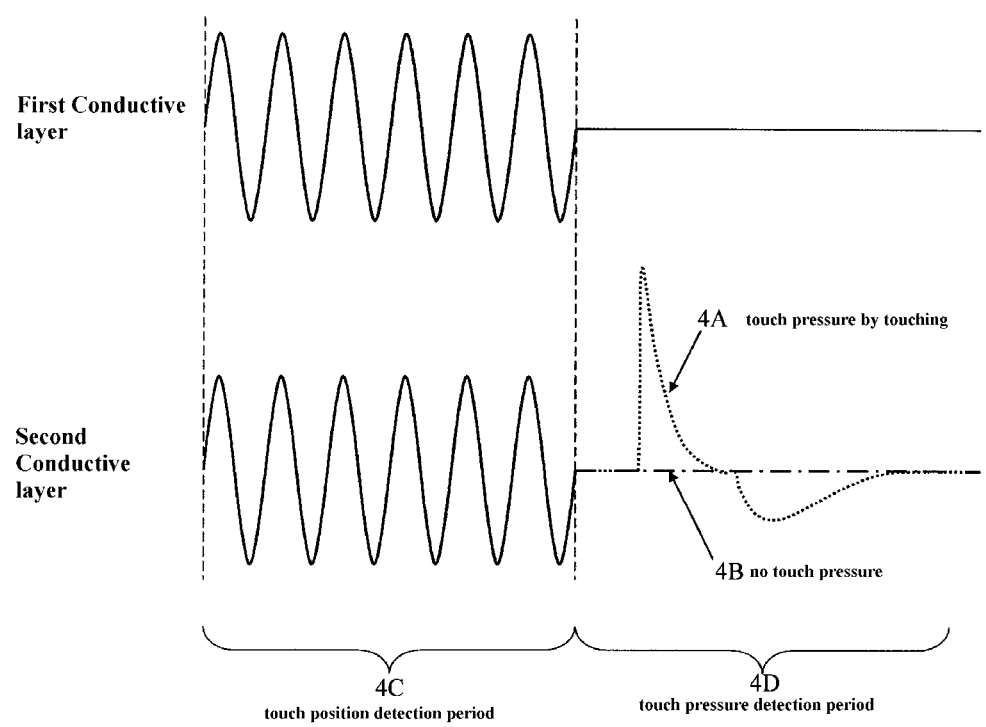
FIG. 4 is an example of timing chart of the first embodiment of the present invention.

FIG. 4 is a timing chart illustrating one example of the time sharing detection. The time sharing detection is divided into a touch position detection period (4C in FIG. 4) and a touch pressure detection period (4D in FIG. 4). In the touch position detection period, for example, sine wave is applied to both the first conductive layer 112 and the second conductive layer 122. In this period, it generates a signal change in the first conductive layer 112, which is nearer to the touched surface by touching (not shown). This signal change is read by the position detection—coordinates calculation IC 2101 in FIG. 5. In the following touch pressure detection period, the first conductive layer 112 is fixed to a constant potential, for example, ground potential. Switching according to the time of applied voltage to the first conductive layer is composed, for example, of a selector 2072, DC drive circuit 2071, and AC drive circuit 207, for example, in the position detection—coordinates detection IC 2101 shown in FIG. 5. In the period applying AC signals, an output of the AC drive circuit 207 is selected by the selector 2072 and in the period applying the fixed specific voltage, an output of the DC drive circuit 2071 is selected by the selector 2072. On the other hand, the second conductive layer 122 is in a floating condition during the touch pressure detection period. Switching between applying AC signals and floating condition is performed, for example, by a circuit shown in FIG. 6. This circuit is connected to the second conductive layer 122 and composed of a high impedance switch 2077 and AC drive circuit 2075. The high impedance switch 2077 is selected to connect to the AC drive circuit 2075 or to be in the floating condition (high impedance) without connection to any circuit. The voltage change in the second conductive layer during a floating state is measured by a voltage monitor (provided in the touch pressure detector 302) composed of FET amplifier, OP amplifier, and the like. In this time, a detection circuit measuring a change of voltage is connected to the part described as the second conductive layer 122 of the high impedance switch 2077 shown in FIG. 6. Then, deflections occur in the piezoelectric sheet and electric charges generate by piezoelectric polarization in case of existing the touch pressure by touching (4A in FIG. 4). Consequently, a change of voltage can be measured as a change of electric potential of the second conductive layer 122 relative to the first conductive layer 112. This change of voltage is reversed in plus and minus at the time of pushing and releasing, respectively. This strength caused by a change of voltage is proportional to the pushing force (correctly speaking, proportional to the electric charge generated by the touch pressure. As the piezoelectric layer changes a capacitance by pushing force, the voltage is not completely proportional to the pushing force, but appropriately proportional thereto.) When there is the touch pressure, the reverse change of electric potential generates to cancel the electric charge caused by the touch pressure (change extending lower relative to the case with no touch pressure in FIG. 4). Strength of the touch pressure can be also obtained by detecting the reverse change of electric potential. The reaction corresponding to the touch pressure can be realized by comparing the measured touch pressure with the threshold memorized in the memory 303 of the touch pressure detection IC 310 in FIG. 3.

For example, switching into a touching state in case of the weak touch pressure (an indeterminate state as to selection during searching the touch position in spite of touching the surface), a provisional selection in case of the intermediate touch pressure (a state prepared for selecting the specified item of the menu), and a final determination in case of the strong touch pressure (a state determining to select the specified item of the menu and the specified item of the attached sub-menu) can be obtained by memorizing the threshold (the lowest step of the threshold is the same as the threshold for detecting the above-mentioned touch pressure) having three steps relative to the touch pressure in the memory 303. When there is no touch pressure (4B in FIG. 4), there is no piezoelectric polarization and no electric charge because no deflection occurs in the piezoelectric sheet.

In addition, waveform applied to the second conductive layer 122 during the touch position detection may not be sine wave in configuration of this time sharing detection. However, when the same sine wave as the first conductive layer 112 is used, the second conductive layer 122 bears a function of the shield surface not to transmit the influence such as radiation noise generated by elements disposed in the underside in case of combining the display device under the piezoelectric sheet. Consequently, the touch position can be detected with high accuracy.

In this embodiment, problems such as a number of using materials and a large size of the whole device as the conventional problems can be effectively solved by using the piezoelectric sheet sandwiched between the first and second conductive layers in order to detect the touch position and the touch pressure.

The Other Embodiment of the Invention

As a second embodiment of the present invention, a variation of the first embodiment will be described. In this embodiment, another example of the detection system of the touch position and the touch pressure will be described.

Figure 5:
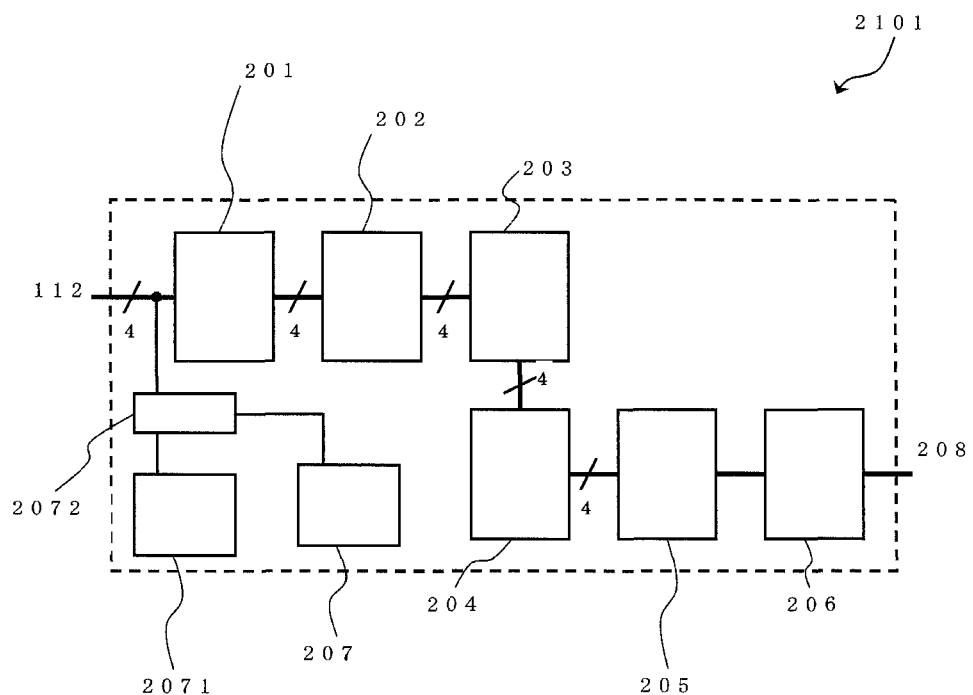
FIG. 5 is an example of block diagram of position detection and coordinates calculation IC used in the present invention.
Figure 6:
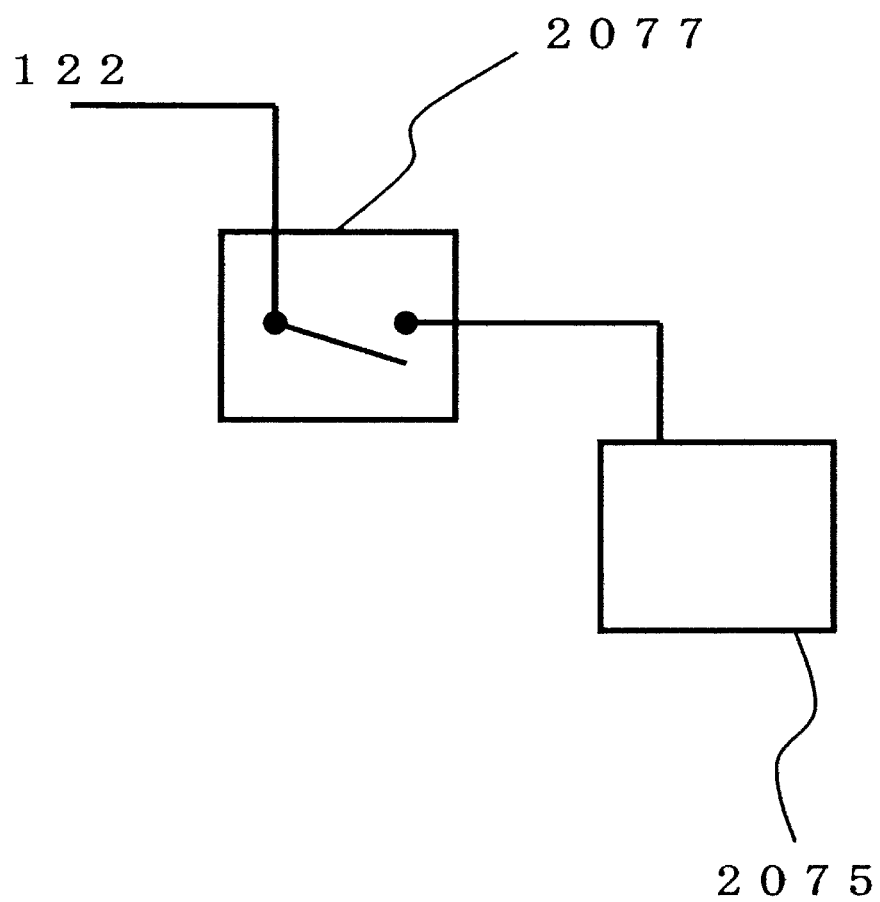
FIG. 6 is an example of block diagram of a circuit carrying out the switching between applying signals and floating conditions used in the present invention.
Figure 7:
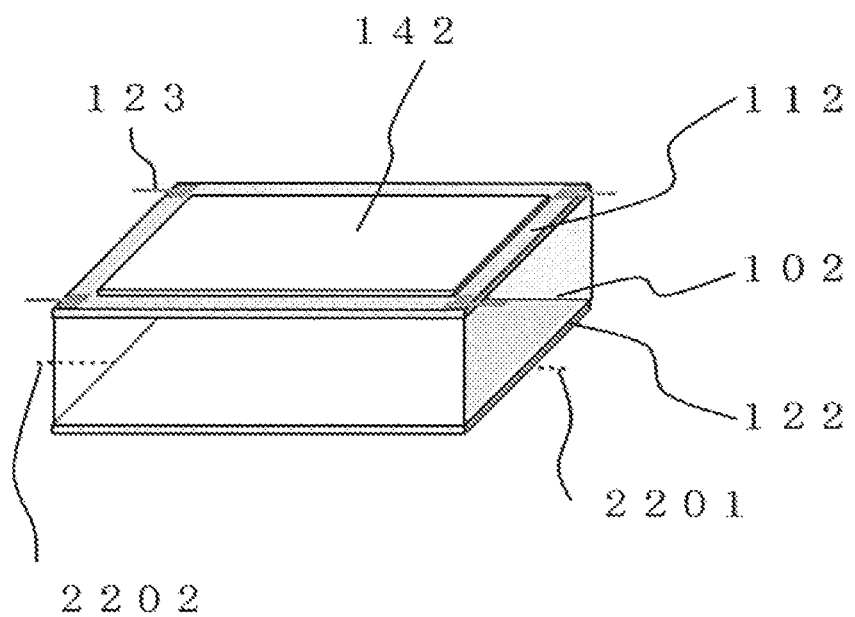
FIG. 7 is a perspective view illustrating a second embodiment of the present invention.
Figure 8:
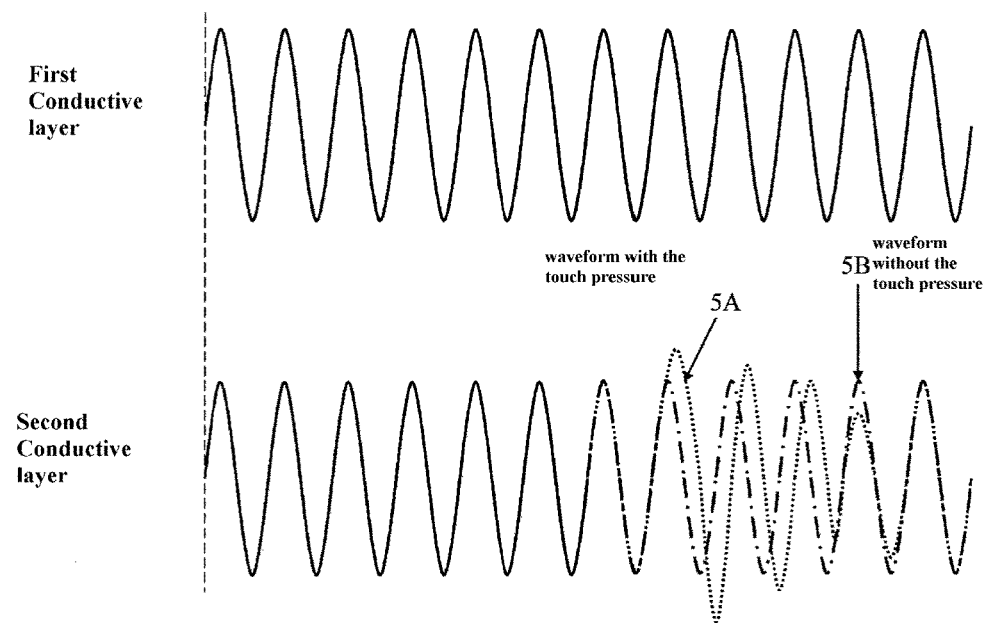
FIG. 8 is an example of timing chart of the second embodiment of the present invention.

An example of the time sharing detection will be described in the above. An example of another system without time sharing will be described. FIG. 7 illustrates a perspective view of detection system without time sharing and FIG. 8 is a timing chart. The first conductive layer 112 is designed to apply AC voltage. On the other hand, the second conductive layer 122 is designed to apply AC voltage from one end (for example, wiring connection 2201 for the second conductive layer) of the conductive layer and detect the voltage at the other end (for example, wiring connection 2202 for the second conductive layer). The touch position and the touch pressure are detected by this configuration. Although a change of electric potential in the first conductive layer by the touch position detected in the first conductive layer 112 is a small change in phase, an amount of change is approximately constant during the touch and a change of the amplitude is large according to the touch condition. Namely, the time shift of the waveform is small according to a change of phase and shifts in parallel relative to time axis. The amplitude changes complicatedly from the touch start to the touch end. On the other hand, a change of electric potential in the second conductive layer by the touch pressure detected through the wiring connection 2202 for the second conductive layer 122 is extremely large in both phase and amplitude. As influences of the touch pressure detected in the second conductive layer are based on a piezoelectric effect and a reverse piezoelectric effect, it becomes a complicated change. As the waveform in case of the touch position and the waveform in case of the touch pressure are completely different, the separation is possible. For example, filtering at specific frequency is possible by using a large change of phase. The amplitude without the touch pressure shows only changes on plus side, which is larger amplitude than the specific amplitude and returns to the specific amplitude, while the amplitude with the touch pressure shows changes on minus side, which is smaller amplitude than the specific amplitude by a reverse piezoelectric effect. Consequently, the separation is possible by using the above feature. A combination of these separation methods is possible. In FIG. 5, 5A in FIG. 5 shows a waveform with the touch pressure and 5B in FIG. 5 shows a waveform without the touch pressure.

In case of the detection by time sharing of the first embodiment, as the detection period of the touch pressure is discontinuous, an estimation of the accurate touch pressure may be difficult. Namely, when a change of the touch pressure is extremely gentle, a change of the touch pressure at one touch is decomposed into a plurality of time sharing. When the detection period of the touch position and the detection period of the touch pressure are combined as one set, a change of the touch pressure can be detected at one touch through a plurality of sets. In this case, it is difficult to follow settings and changes of detection reference, as the applied waveform changes at the time of switching of the time sharing. For example, in case of the following detection period of the touch position shifted after the terminated detection period of the touch pressure, in FIG. 4, the second conductive layer 122 is considered as the same electric potential and the same waveform as the first conductive layer 112 from the floating condition. In this case, as it is operated to identify the electric potential of both conductive layers including components of the polarized electric charge generated by the touch pressure, signals in the following detection period of the touch pressure are detected to be considered as no touch pressure in terms of the touch pressure having existed at the start of the previous detection period of the touch position. Consequently, it is difficult to estimate an accurate touch pressure, as the touch pressure becomes discontinuous for each set of detection period. It may be possible that data for each detection period are memorized in the memory 303 of the touch pressure detection IC 301 to maintain the continuity at controller 301.

On the other hand, in the system without the time sharing of this embodiment, although the separation of complicated waveforms is required, there are little or no difficulties in case of following the settings and changes of reference, as the applied waveform is constantly continuous. Then, it is possible to estimate the touch pressure continuously. Consequently, the touch pressure detection IC 310 may be simple in structure.

Next, a third embodiment of the present invention will be described with reference to drawings.

Figure 9:
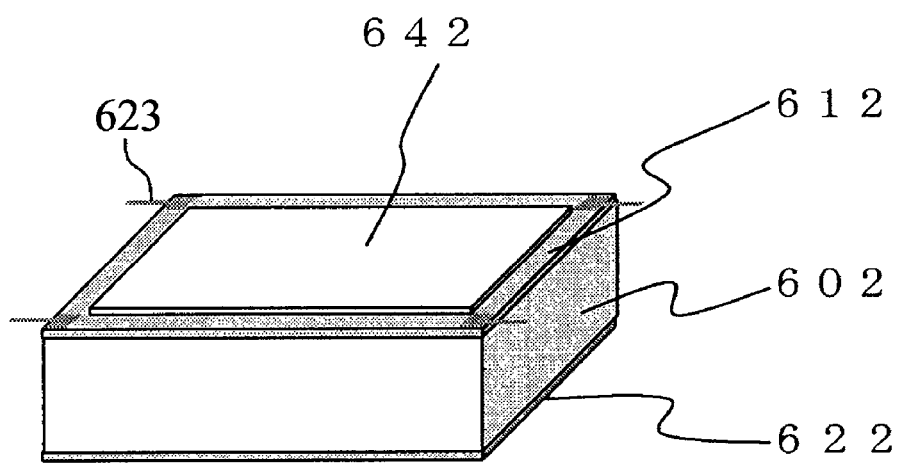
FIG. 9 is a perspective view illustrating a third embodiment of the present invention.

With reference to FIG. 9, which is a perspective view of this embodiment, the embodiment of the present invention is configured to comprise a piezoelectric layer 602, a first conductive layer 612 disposed on one surface of the piezoelectric layer 602, a second conductive layer 622 disposed on the other surface of the piezoelectric layer 602, and an insulating layer 642 disposed on the opposite surface of the surface, which the piezoelectric layer 602 of the first conductive layer 612 is disposed.

Preferably, the piezoelectric layer 602 is a transparent piezoelectric sheet in visible light region. Depending on the use purpose, it may be a piezoelectric sheet with transparent characteristics not only in visible light region, but in wavelength region according to the use purpose.

In this embodiment, the first conductive layer 612 is designed to detect not only the touch position on the surface, but also the touch pressure. FIG. 9 illustrates electrodes provided at four corners of the first conductive layer 612 and wiring connection 623 derived therefrom as an example of electrodes disposed for detection. The second conductive layer 622 is designed to apply signals.

The wiring connection 623 derived from electrodes provided at four corners of the first conductive layer 612 in FIG. 9 is designed to feed, for example, AC signals to the first conductive layer and understand a difference of the current change caused by the touch and an amount of current change caused by the touch position by reading current change flowing through the wiring connection 623. The voltage generated in piezoelectric substance caused by the touch pressure can be understood by the wiring connection 623 derived from electrodes provided in the first conductive layer 612 and the second conductive layer 622. Next, these configurations will be described in detail.

In terms of a difference between this embodiment and the first and second embodiments, all of the detection in this embodiment is performed in the first conductive layer 612. That is, the detection is performed by the time sharing. The position detection—coordinates calculation IC 210 and touch pressure detection IC 310 are performed to separate for each time. For example, two ICs are, respectively, connected to the first conductive layer 612. It is configured to switch each of them periodically or intermittently by means such as a switch and a relay.

Figure 10:
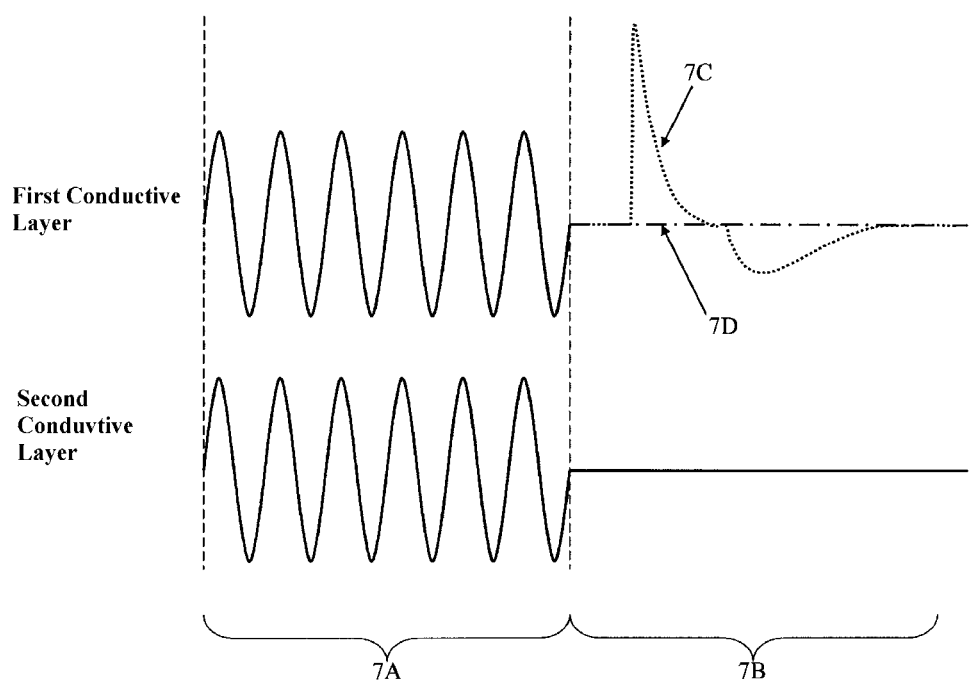
FIG. 10 is an example of timing chart of the third embodiment of the present invention.

FIG. 10 is a timing chart showing an example of time sharing detection in this embodiment. The time sharing detection is divided into the touch position detection period (7A) and the touch pressure detection period (7B). The point, which is different from one in FIG. 4, is that an electric potential of the second conductive layer is sine wave or fixed electric potential. The electric potential of the first conductive layer is set from sine wave to be in the floating state to be a timing chart like replacing the first for the second in FIG. 4. That is, during the period using the touch pressure detection IC 310 (touch pressure detection period), a connection between the position detection—coordinates calculation IC 210 and the first conductive layer 612 is in a high impedance state, and the first conductive layer 612 is in the floating state. During this period, the touch pressure detection IC 310 is connected to the first conductive layer 612 to detect the touch pressure. On the other hand, it is possible to switch between the sine wave derived from the AC drive circuit 207 and the fixed electric potential derived from the DC drive circuit 2071 by connecting a selector 2072, a DC drive circuit 2071, and a circuit corresponding to the AC drive circuit 207 to the second conductive layer 622.

This configuration is possible to detect the touch position and the touch pressure in spite of the time sharing detection. FIG. 10 shows a waveform 7C in case of having touch pressure and a waveform 7D in case of having no touch pressure. Compared with the time sharing detection in the first embodiment, the second conductive layer is designed to be constantly supplied with some electric potential and signals.

Hence, the second conductive layer 622 functions as a shield surface in order not to transmit the radiation noise or the like receiving from the display devices to the first conductive layer 612 in case of combining the display devices under the second conductive layer 622. Consequently, it is strong against noise receiving from the reverse face, compared with the time sharing detection in the first embodiment.

Next, a fourth embodiment of the present invention will be described with reference to drawings.

Figure 11:
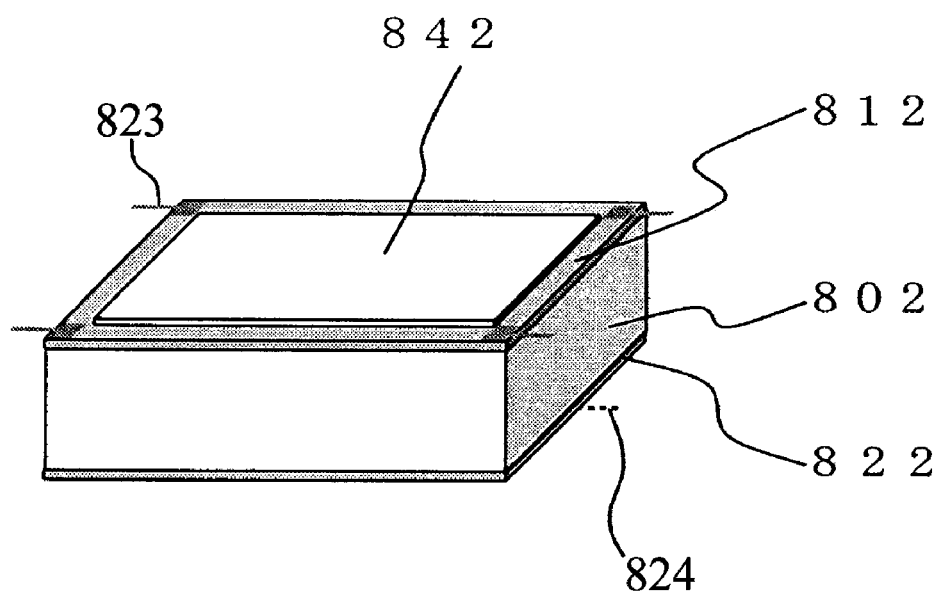
FIG. 11 is a perspective view illustrating a fourth embodiment of the present invention.

FIG. 11 is a perspective view showing this embodiment. As with FIG. 1 showing the first embodiment, FIG. 11 shows a configuration comprising a piezoelectric layer 802, a first conductive layer 812 disposed on one surface of the piezoelectric layer 802, a second conductive layer 822 disposed on the other surface of the piezoelectric layer 802, and an insulating layer 842 disposed on the opposite surface of the surface, on which the piezoelectric layer 802 is disposed.

Preferably, the piezoelectric layer 802 is a transparent piezoelectric sheet in visible light region. Depending on the use purpose, it may be a piezoelectric sheet with transparent characteristics not only in visible light region, but in wavelength region according to the use purpose.

This embodiment is designed to detect the position on the surface in the first conductive layer 812. As an example of electrodes disposed for detection, electrodes provided at four corners of the first conductive layer 812, a wiring connection 823 derived therefrom, as well as electrodes (not shown) provided in the second conductive layer 822, and a wiring connection 824 derived therefrom are shown in FIG. 11.

Figure 12:
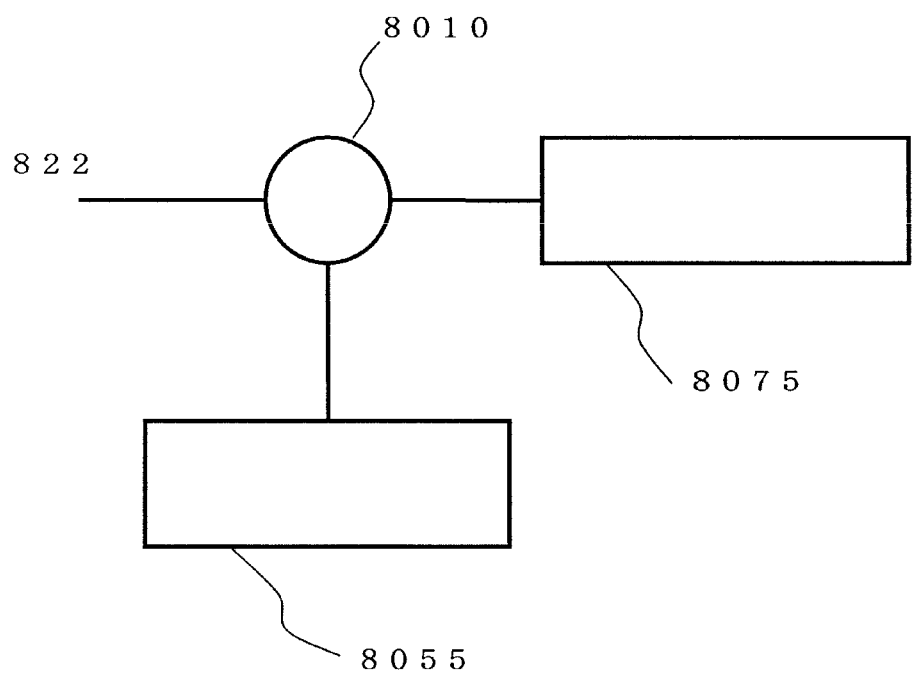
FIG. 12 is an example of block diagram of a circuit generating signals applying to the second conductive layer used in the fourth embodiment of the present invention.

On the other hand, the second conductive layer 822 is designed to superpose and apply vibration signals (a waveform of vibration signals will be later described), as needed, in addition to the same signals as signals for detecting the touch position applied to the first conductive layer 812. This superposed vibration signals are used for performing a feedback caused by the vibration to the touched person or objects. FIG. 12 illustrates a block diagram of circuit (second means for applying signals), which is connected to a wiring connection 824 for the second conductive layer to superpose and apply signals for detecting the touch position and vibration signals. This circuit has a superposition part 8010 for superposing an output of AC drive circuit 8075 generating signals for detecting the touch position and an output of vibration signal generator (vibration signal generation means) 8055.

The above mentioned amplitude of vibration signals is configured to use a booster circuit composed by DC-DC converter or the like, as needed, when higher voltage relative to the touch position signals etc. is required.

In addition, vibration signals used for the feedback caused by vibration may be suitably selected by vibration stimulus to be presented.

For example, vibration stimulus of around 5 Hz is possible to present tactile impression (tactile feeling). This reason is that low-frequencies around this frequency are called as SA type, in particular, the Merkel's tactile disk, which is classified as SAI, that is, a wide range of receptive field, is effectively stimulated. In this case, the concave and convex impression can be clearly presented or acknowledged by large variations based on the low-frequency vibration. This SAI-type tactile receptive vessel has a function as a strain sensor to correspond to the pressure sensation.

On the other hand, it is possible to present the rough impression in the stimulus changing vibration frequency around 20 Hz. It is possible to present the rough impression more clearly by combining with velocity change of tactile movement etc. Frequencies around this area are considered as stimulating Meissner's tactile corpuscle, which is classified as FAI, that is, high frequency and wide range of receptive field. This FAI-type tactile receptive vessel has a function as a velocity sensor to correspond to a roughness sensation (coarseness feeling).

Moreover, the signal stimulus around 200 Hz may be possible to present a feeling of friction. In this case, the feeling of friction can be presented more clearly by combining with acceleration change (That is, action to move fingers etc.) of tactile movement etc. Frequencies around this area are considered as stimulating Pacinian corpuscle, which is classified as FAII, that is, high frequency and narrow range of receptive field. This FAII-type tactile receptive vessel has a function as an acceleration sensor to correspond to a frictional sensation (feeling of friction).

Figure 13:
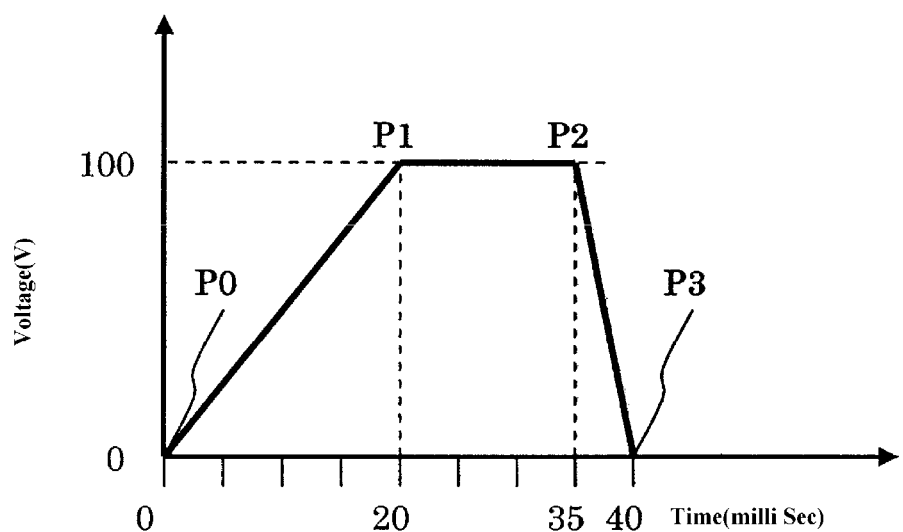
FIG. 13 is an example of applied waveform of tactile sensation feedback to be used in the fourth embodiment of the present invention.

In addition, the following view of consideration is required in case of presenting a simple operational feeling. That is, as sensitivity of almost the tactile receptive vessel decreases in a range of higher frequencies than several hundreds of Hz, it is not excellent in terms of the tactile feedback and electric power consumption thereof comes to become large. On the other hand, although swift build up time yields strong tactile impression, unnecessary click yields at the same time. Consequently, it is necessary to regulate waveforms of the applied vibration signals depending on a kind of the presenting tactile feedback. As an example, a waveform shown in FIG. 13 is of use as a reference. This is an example of waveform appeared in the tactile feedback simulating a mechanical button. The period from P0 to P1 shows a response of the tactile feedback at the time of pushing a button, and the period from P2 to P3 shows a response of the tactile feedback at the time of releasing a button. The period P1 to P2 is a period, during which a button is pushed, and this period is determined by actual touched situation. Vibrations of piezoelectric elements are regulated to recognize the tactile impression to person by generating a waveform shown in FIG. 13 at the vibration signal generator 8055.

When high voltage is required, it is possible to satisfy the above needs by changing or modifying the circuit including DC-DC converter etc. While, it is possible to reduce the voltage to become a large driving power per voltage even at the same voltage by forming a thick film of the piezoelectric film with use of a laminating method thereof etc.

A fifth embodiment of the present invention will be described with reference to drawings.

Figure 14:
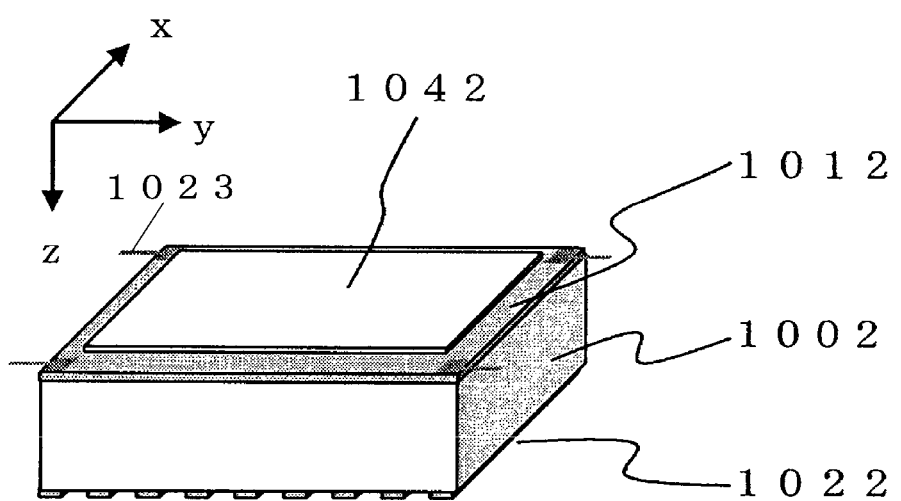
FIG. 14 is a perspective view illustrating a fifth embodiment of the present invention.

FIG. 14 is a perspective view showing this embodiment. FIG. 14 shows a configuration comprising a piezoelectric layer 1002, a first conductive layer 1012 disposed on one surface of the piezoelectric layer 1002, a second conductive layer 1022 disposed on the other surface of the piezoelectric layer 1002, and an insulating layer 1042 disposed on the opposite surface of the surface, on which the piezoelectric layer 1002 is disposed. The second conductive layer 1022 is performed by patterning in a plurality of stripes.

Preferably, the piezoelectric layer 1002 is a transparent piezoelectric sheet in visible light region. Depending on the use purpose, it may be a piezoelectric sheet with transparent characteristics not only in visible light region, but in wavelength region according to the use purpose.

This embodiment is designed to detect the position on the surface in the first conductive layer 1012. As an example of electrodes disposed for detection, electrodes provided at four corners of the first conductive layer 1012, and a wiring connection 1024 derived therefrom are shown in FIG. 14.

Figure 15:
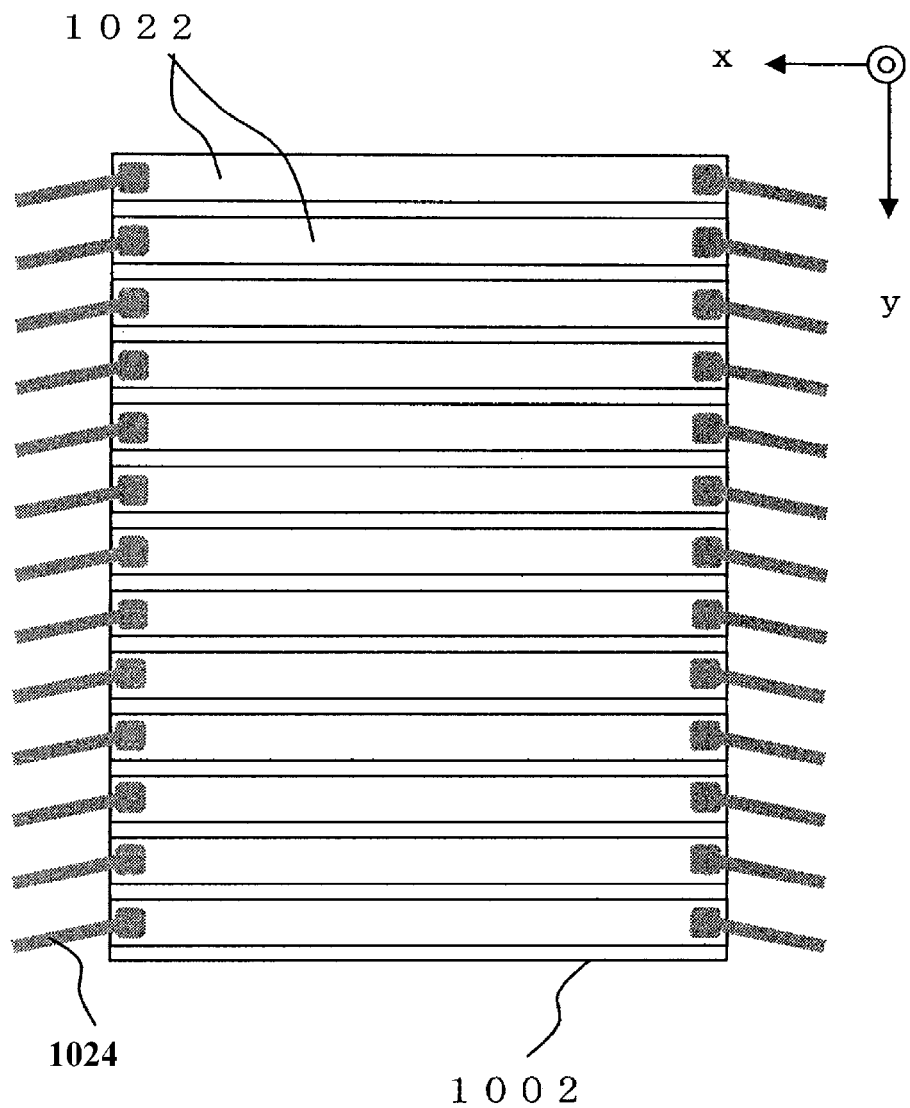
FIG. 15 is a plan view in case of observing the fifth embodiment of the present invention from a second conductive side.

On the other hand, the second conductive layer 1022 is configured to provide electrodes at both ends of each conductor performed by patterning in stripes, and to derive the wiring connection 1024 therefrom. A plan view of this situation is shown in FIG. 15. FIG. 15 shows a plan view of the configuration of FIG. 14 seen from a side of the second conductive layer 1022. In addition, any direction in FIG. 14 and FIG. 15 is understood by signs of x, y, and z coordinates systems shown in figures. Each pattern in stripes is formed to be longitudinal in x direction in figures and stripes are lined up in y direction.

This embodiment is configured to measure voltage at both ends of stripe by electrodes provided at both ends of the second conductive layer performed by patterning in stripes. Shown in FIG. 15, it is configured to provide electrodes at both ends of each pattern in stripes of the second conductive layer 1022 performed by patterning in stripes and provide a wiring connection 1024 for each electrode. A measurement means such as voltage amplifier is provided on the tip of each wiring connection 1024.

The touch position can be obtained from the touch pressure by an effect of the patterning in stripes and an effect of the voltage measurement at both ends. The embodiment will be described in detail.

Figure 16:
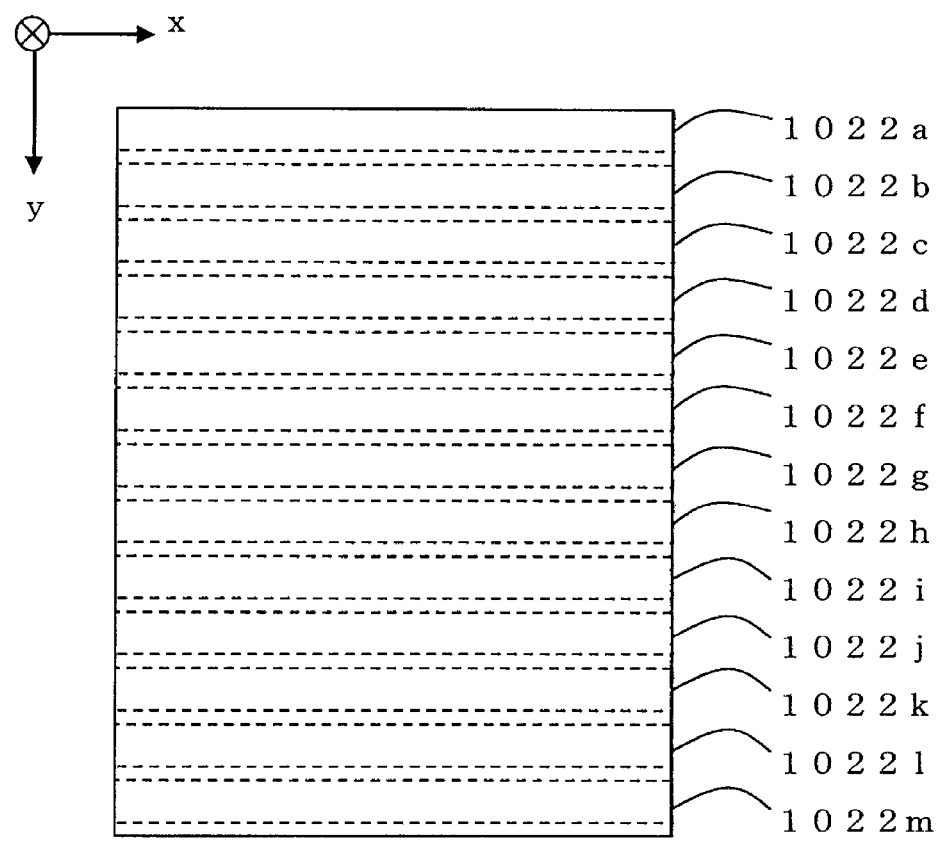
FIG. 16 is a plan view in case of observing the second conductive surface of the fifth embodiment from a first conductive side.

FIG. 16 shows a view seen from the side on which users touch this conductive layer in stripes, that is, a view seen from the first conductive layer. In this figure, the wiring connection is not shown but only the second conductive layer performed by patterning is shown. The second conductive layer is considered to be divided into thirteen stripes 1022*a* to 1022*m*.

Figure 17:
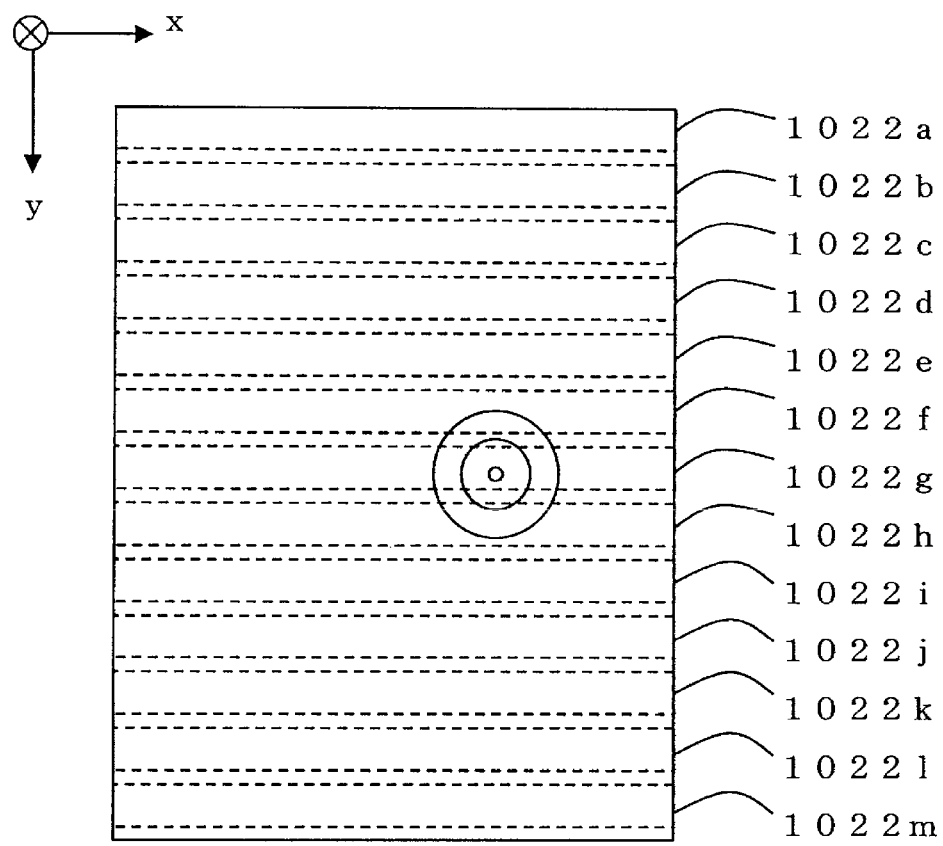
FIG. 17 is a view illustrating schematically a state of deflection in the fifth embodiment of the present invention.
Figure 18:
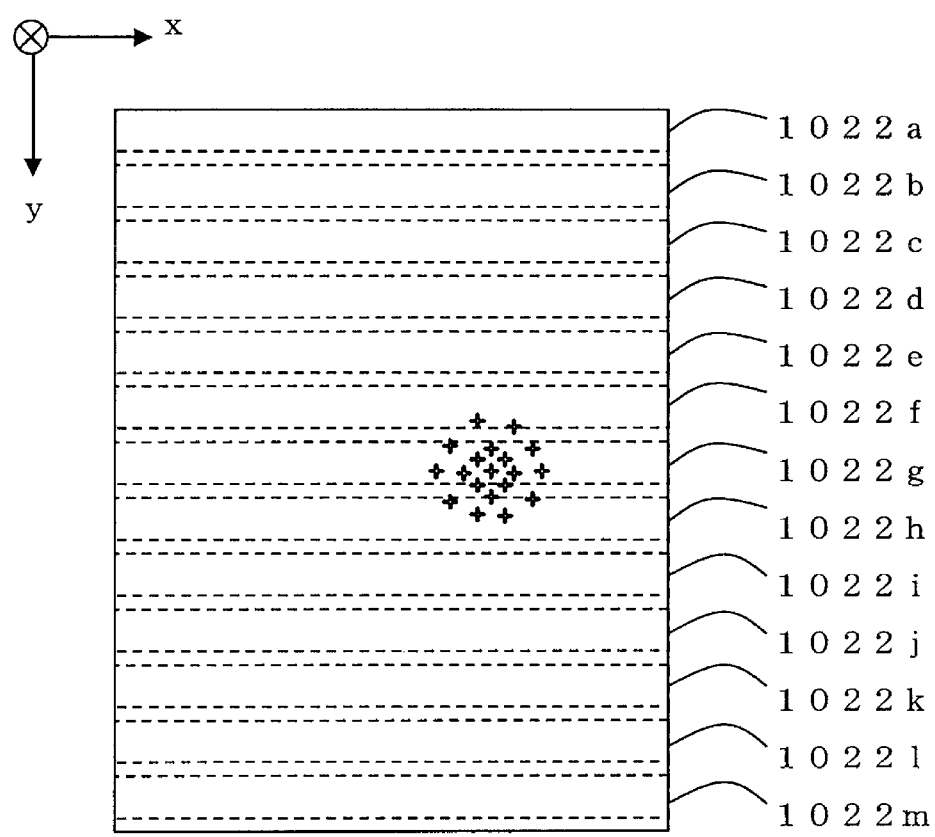
FIG. 18 is a view illustrating schematically a state of electric charge caused by piezoelectric polarization in the fifth embodiment of the present invention.

When any portion is touched under some pressure with a pen or the like in this embodiment, a deflection occurs concentrically around the touched portion with the pen or the like, as shown in FIG. 17. When a polarized electrical charge induced thereon is shown, for example, it will be shown in FIG. 18. Plus sign is represented to replace the generation of the polarized electric charge and its strength with a density on the surface. Namely, the polarized electric charge, which has a different strength concentrically around the touched portion, is observed. In a measurement of state in FIG. 18, subtle polarized electric charge is observed by two plus signs existed in the stripe 1022*f*. On the other hand, in the stripe 1022*h* existing four plus signs, it is observed polarized electric charges about two times as much as 1022*f*. In the stripe 1022*g* existing twelve plus signs, it is observed polarized electric charges about three times as much as 1022*h*. In regions on the other stripes existing no plus signs, it is observed no polarized electric charge or a very small amount even if the polarized electric charge is observed. As above mentioned, it is revealed that the position in y direction of the touched portion is situated nearer 1022h in relation to a center of 1022g by comparing the polarized electric charges observed in each stripe. Thus, the position in y direction can be understood through the polarized electric charge by the touch pressure. When the resistance of each stripe is sufficiently small, the polarized electric charge is distributed in each stripe after it has occurred at the generation position of deflection. Even in case of generation of such electric charge distribution, it is able to make fine distinctions between the stripes (for example, 1022g) generating a large polarized electric charge and the stripes generating no polarized electric charge. Consequently, the position in y direction can be understood.

Figure 19:
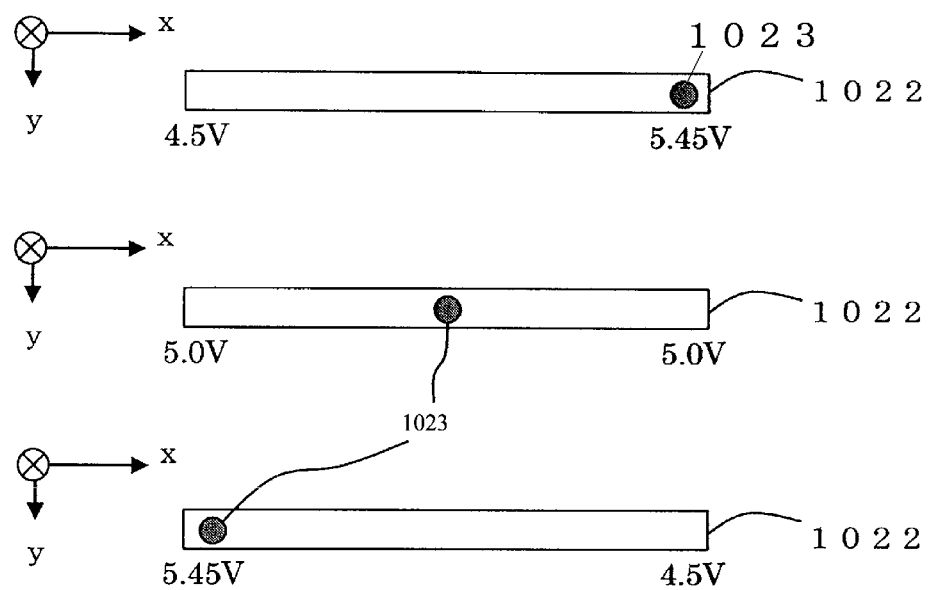
FIG. 19 is a view showing a difference between voltages at both ends caused by position generating the touch pressure in X direction in the fifth embodiment of the present invention.

Electrodes are provided at both ends of stripes to measure the voltage at both ends of each stripe. This is configured to set an appropriate value as a sheet resistance of the second conductive layer 1022 and regulate the thickness or the like to become an appropriate value in terms of the voltage measurement part and a time constant of the piezoelectric layer 1002. Consequently, voltage generated at both ends of the stripe by the touch pressure changes depending on the touch position 1023 in the stripe. It is shown schematically in FIG. 19. It shows different voltage observed at both ends depending on the difference of the touched position 1023. Although a value of voltage is schematically shown, when it is touched, for example, at right end, 5.45 V at right side and 4.5V at left side are measured. When it is touched at center, 5.0V at left and right sides are measured. This reveals that voltages observed at both ends are mutually different according to a different position affecting the touch pressure in x direction. It is possible to seek the position 1023 in x direction generating the touch pressure by using the above effect.

In this way, it is possible to seek the position on the surface generating the touch pressure by measuring voltage of the second conductive layer in stripes and at both ends of the stripe.

The first conductive layer 1012 is necessary to have conductivity in the touched object to virtual ground for surface-capacitive system. Namely, although it is possible to detect the touch position 1023 in an example connecting through bodies like human body to the virtual ground, an example of specific conductive pen connected to the ground, and the like, it is impossible to detect the touch position 1023 in case of touching with an ordinary pen. In this fourth embodiment, as it is possible to seek the touch position with use of the touch pressure, it is possible to understand the touch position 1023 by touching with an ordinary pen or touching through insulators by a configuration to comprise the first conductive layer without patterning, the second conductive layer with patterning in stripes, and a piezoelectric layer therebetween.

Next, a sixth embodiment of the present invention will be described with reference to drawings.

Figure 20:
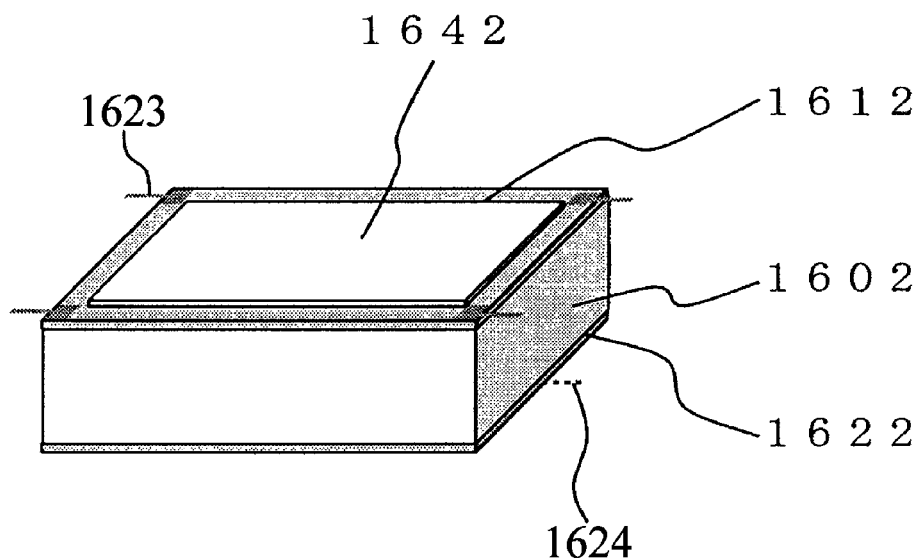
FIG. 20 is a perspective view illustrating a sixth embodiment of the present invention.

FIG. 20 is a perspective view showing this embodiment. FIG. 20 is configured to comprise a piezoelectric layer 1602, a first conductive layer 1612 disposed on one surface of the piezoelectric layer 1602, a second conductive layer 1622 disposed on the other surface of the piezoelectric layer 1602, and an insulating layer 1642 disposed on the opposite surface of a piezoelectric layer 1602 of the first conductive layer 1612, as well as FIG. 1 of the first embodiment and FIG. 11 of the fourth embodiment of this invention.

Preferably, the piezoelectric layer 1602 is a transparent piezoelectric sheet in visible light region. Depending on the use purpose, it may be a piezoelectric sheet with transparent characteristics not only in visible light region, but in wavelength region according to the use purpose.

Figure 21:
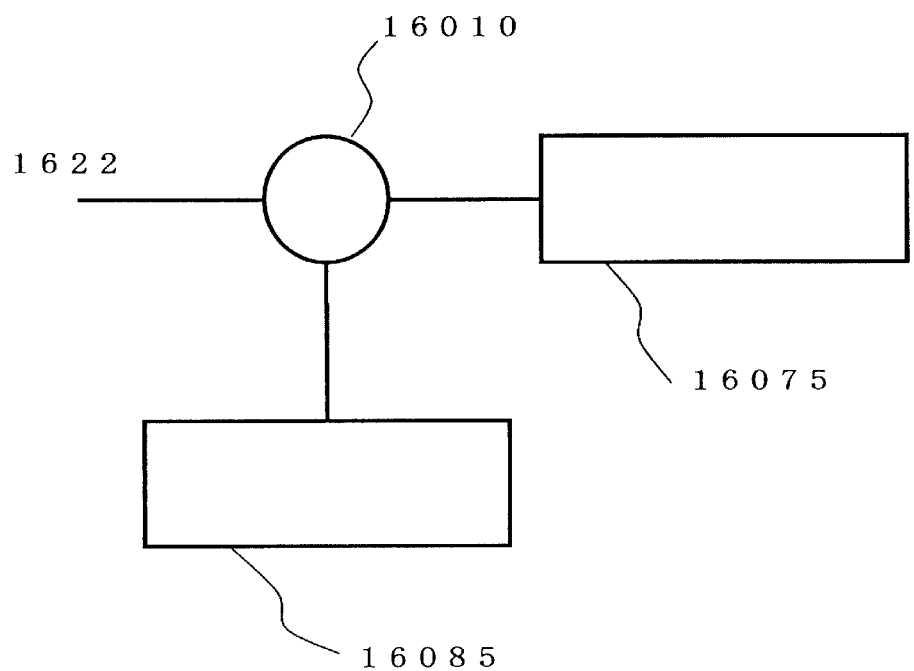
FIG. 21 is an example of block diagram of a circuit generating signals applying to a second conductive layer used in the sixth embodiment of the present invention.

This embodiment is designed to detect the position on the surface in the first conductive layer 1612. As an example of electrodes disposed for detection, electrodes provided at four corners of the first conductive layer 1612, a wiring connection 1623 derived therefrom, as well as electrodes (not shown) provided in the second conductive layer 1622, and a wiring connection 1624 derived therefrom are shown in FIG. 20. FIG. 21 illustrates a block diagram of circuit (acoustic generation signals applying means), which is connected to a wiring connection 1624 for the second conductive layer 1622 to superpose and apply signals for detecting the touch position and acoustic generation signals. This circuit has a superposition part 16010 for superposing an output of AC drive circuit 16075 generating signals for detecting the touch position and an output of acoustic generation signal generator (acoustic generation signals generation means) 16085.

The point of this embodiment, which is largely different from one in FIG. 12 of the fourth embodiment, is waveforms, frequencies, and strength of vibration signals superposed at a circuit shown in FIG. 21. This embodiment is designed to generate sounds as one of user feedbacks. As one example, it is configured to eliminate undesirable sound generation in the fourth embodiment. In this embodiment, it is possible for users to detect sound that in particular, frequencies ranging from several hundreds of Hz to several kHz are considered as frequencies of easy-to-hear sound. Consequently, this embodiment is designed to generate audible sounds for users by detecting the position on the surface in the first conductive layer 1612 and applying signals between the first conductive layer 1612 and the second conductive layer 1622.

Figure 22:
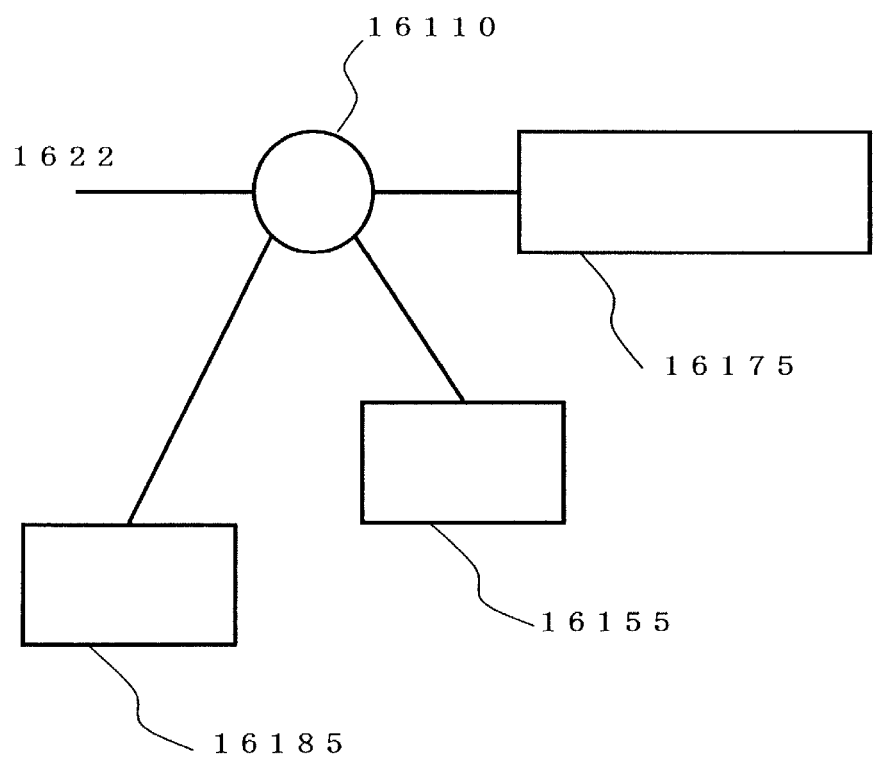
FIG. 22 is the other embodiment of block diagram of a circuit generating signals applying to the second conductive layer used in the sixth embodiment of the present invention.

Furthermore, it is possible to provide preferably both tactile impression and sound, depending on a waveform of superposed vibration signals. That is, it is possible to provide both tactile impression and sound by superposing high-frequency signals for acoustic sense in comparison with signals for tactile impression to low-frequency signals for tactile impression in comparison with signals for acoustic sense. In this case, FIG. 22 shows an example of block diagram of circuits (acoustic generation signals applying means) connected to the wiring connection for the second conductive layer 1622 and applied to superpose both signals and vibration signals for position detection and the acoustic generation signals. This circuit has a superposition part 16110 for superposing an output of AC drive circuit 16175 generating signals for detecting the touch position, an output of vibration signal generator 16155, and an output of acoustic generation signal generator 16185.

As a result, this embodiment is characterized by generating not only tactile impression, but also audible sound for users.

A seventh embodiment of the present invention will be described in detail with reference to drawings.

Figure 23:
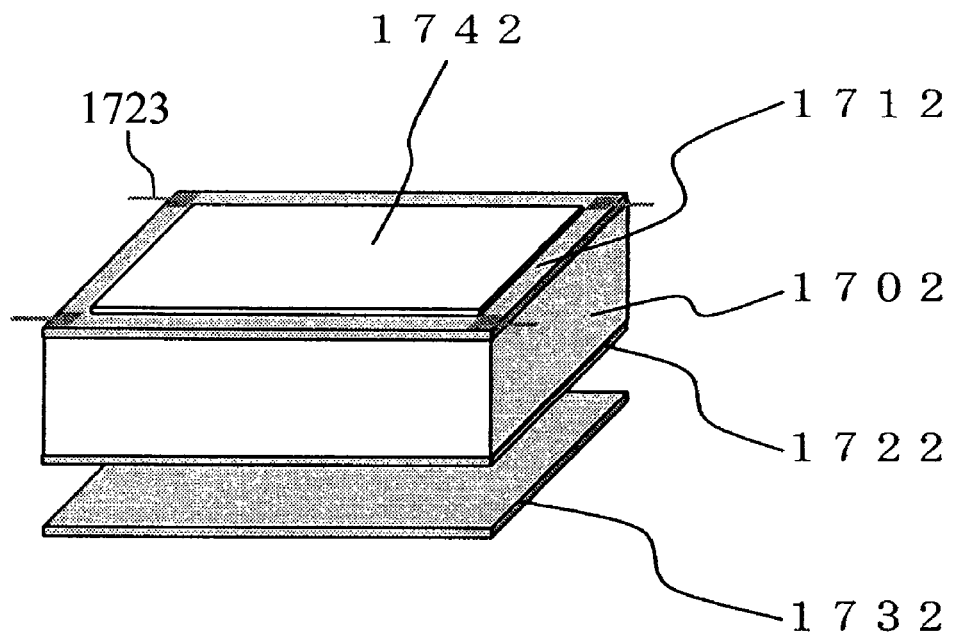
FIG. 23 is a perspective view illustrating a seventh embodiment of the present invention.

With reference to FIG. 23 which is a perspective view of this embodiment, this embodiment is configured to comprise a piezoelectric layer 1702, a first conductive layer 1712 disposed on one surface of the piezoelectric layer 1702, a second conductive layer 1722 disposed on the other surface of the piezoelectric layer 1702, an insulating layer 1742 disposed on the opposite surface of the surface, which the piezoelectric layer 1702 of the first conductive layer 1712 is disposed, and a third conductive layer 1732 disposed at an interval of predetermined distant on the opposite side of the first conductive layer 1712 relative to the second conductive layer 1722.

Preferably, the piezoelectric layer 1702 is a transparent piezoelectric sheet in visible light region. Depending on the use purpose, it may be a piezoelectric sheet with transparent characteristics not only in visible light region, but in wavelength region according to the use purpose.

This embodiment is configured to detect the touch position on the surface of the first conductive layer 1712 and the touch pressure in the second conductive layer 1722. FIG. 23 shows electrodes provided at four corners of the first conductive layer 1712 and a wiring connection 1723 derived therefrom as an example of electrodes for detection.

The wiring connection derived from the electrode provided at four corners of the first conductive layer 1712 shown in FIG. 23 is designed to feed, for example, AC signals to the first conductive layer. The wiring connection is possible to understand differences of current change caused by the touch and an amount of current change by reading the current change flowing through the wiring connection. It is possible to understand voltage generated in the piezoelectric substance caused by the touch pressure with use of wiring connection (not shown) derived from electrodes provided in the first conductive layer 1712 and the second conductive layer 1722. This embodiment is designed to have the third conductive layer 1732 and apply to the third conductive layer 1732 without applying direct signals to the second conductive layer 1722. These configurations will be described in detail.

In the other embodiments, the second conductive layer is used for both applying and detecting signals or only for applying signals[K4]. On the other hand, in this embodiment, the second conductive layer 1722 is designed to use only for detection of signals. Signals, which are required for applying to the second conductive layer 1722, are obtained as a result of signals applied to the first conductive layer 1712 and the third conductive layer 1732 by the capacitive coupling among the first conductive layer 1712, the third conductive layer 1732, and the second conductive layer 1722[K5] provided therebetween.

Ideally, when the piezoelectric layer 1702 does not generate piezoelectricity, it is preferable that capacitance between the first conductive layer 1712 and the second conductive layer 1722 is equal to one of the second conductive layer 1722 and the third conductive layer. It is preferable that a sheet resistance, a system for applying signals (for example, to apply from how many places), and the applied signals are the same in terms of the first conductive layer 1712 and the third conductive layer 1732. The electric potential induced by the second conductive layer 1722 is configured to be the same electric potential as the first conductive layer 1712 and the third conductive layer 1732. Provided that the [K6]frequency of detection signals for the touch panel of surface capacitive system applying to the first conductive layer 1712 becomes specific conditions, it may sometimes reveal piezoelectricity to be reacted by the piezoelectric layer to signals such as sine wave applying to the first conductive layer 1712. In this case, it is preferable that frequency of detection signals is changed, or capacitance change by changing thickness etc. of piezoelectric layer caused by piezoelectricity induced by frequency of detection signals is considered in terms of capacitance calculation between the first conductive layer 1712 and the second conductive layer 1722 affecting a ratio of capacitance of capacitive coupling.

In the above configuration, it is possible to obtain the desired signal waveform by inducing the capacitive coupling without applying signals directly to the second conductive layer 1722.

Figure 24:
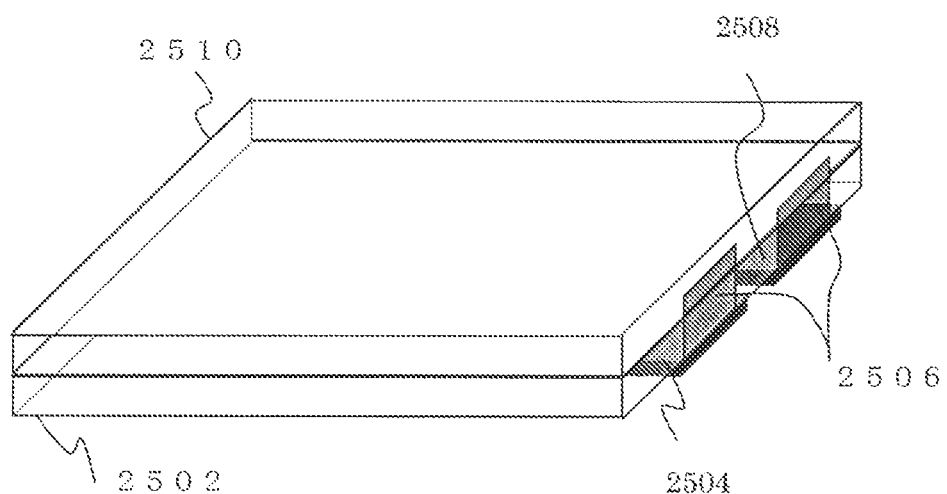
FIG. 24 is a view illustrating an example comprising the piezoelectric sheet, the position detection and coordinate calculation IC, and an input-output device having a pressure detection IC.

In this configuration, an electrical connection of the second conductive layer 1722, which is not indirect connection such as capacitive coupling, but direct connection to the outside, is only the configuration for detecting the touch pressure in the second conductive layer 1722. As it is not necessary to apply detection of the touch pressure in time division and it is not affected by applying signals, this is configured to decrease noise or the like. When the display device and the like is disposed on a reverse side of the third conductive layer 1732, detections of touch pressure and touch position are improved in precision, as the third conductive layer 1732 functions as a shield surface against noises from the display device. FIG. 24 illustrates an example of configuration for combining the above described piezoelectric sheet and the display device. The display device 2502 is disposed under the piezoelectric sheet 2510. As the piezoelectric sheet 2510 is approximately transparent, a display of the display device 2502 can be exactly observed without problems. The piezoelectric sheet 2510, the position detection and coordinates calculation IC 2508, and the touch pressure detection IC 2504 are connected through connection parts 2506. In figure, these ICs 2508 and 2504 are disposed at a reverse surface of the display device 2502 by providing the connection parts 2506 in the side surface of the display device 2502.

Example 1

An Example according to the first embodiment of the present invention will be described.

This example is designed to use PVDF film as a piezoelectric layer 102. PVDF film is assumed to be 50 μm in thickness. After it is formed like a film by uniaxial stretching after extrusion, the piezoelectricity is provided by preparing metal electrode outside, applying high voltage, and performing a polarized treatment (poling process). Although the piezoelectric treatment is performed after the film forming, the polarized treatment may be performed during the mechanical process such as stretching.

A transparent electrode films are formed in thickness of 50 nm by sputtering technique on both surfaces of polarized PVDF film with use of ITO (indium, tin oxide) In this time, as transparent electrode film deposition conditions composing of kinds of target, oxygen pressure, deposition temperature, ITO film on the side of the first conductive layer is 500Ω [K7] in sheet resistance and ITO film on the side of the second conductive layer is 50Ω in sheet resistance.

Electrodes are formed with silver paste at four corners of ITO film corresponding to the first conductive layer, and four wirings are formed in total by connecting to the electrodes. As it is little or no affected by influence of outside noise, the wiring is applied as coaxial wiring.

Figure 25:
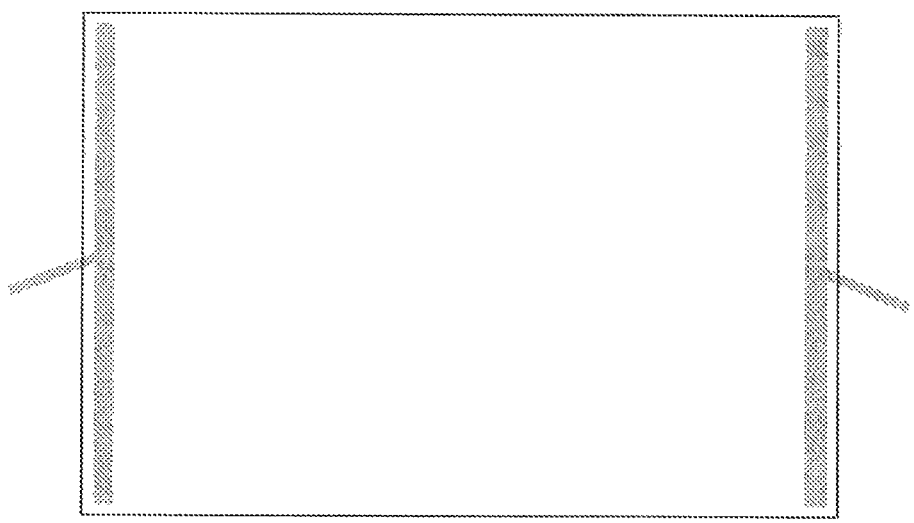
FIG. 25 is a plan view illustrating an example of an electrode provided in the second conductive layer in an example 1 of the present invention.

On the ITO film corresponding to the second conductive layer, two electrodes are formed with silver paste, respectively, at two points in two narrow sides of the rectangle, which is an external form of piezoelectric layer, that is, at two points in a long direction of distance between two points. Furthermore, two wirings in total are formed by connecting the wirings to the electrodes respectively. This appearance is shown in FIG. 25. In figure, the electrodes extending in the vertical direction are provided using silver paste at left and right ends of the conductive layer. In this case, the wirings are coaxial wirings in order to be little or no affected by influence of outside noise and improve a shield effect to a maximal degree at the time of using the impedance converter circuit with high input impedance, where voltage is detected.

The voltage monitor for detecting voltage of the second conductive layer may use FET switch, source follower, or voltage follower using OP amplifier.

Furthermore, the above-mentioned position detection and coordinates calculation IC and touch pressure detection IC are used.

This example is possible to detect the touch position at 3% of precision to diagonal size of the touch detection area. Pushing and release of the touch pressure can be measured from 0.3 N (Newton) to 8 N. Although the pushing force beyond 8 N can be detected, nonlinear characteristics is seen between pressure and electric potential. As it seems that the transformation or the like of housing supporting a piezoelectric sheet may be related thereto, practical levels in this example are used up to 8 N. On the other hand, relation between pressure and voltage is appropriately linear during 0.3 N to 8 N. The linearity is extremely preferable as the coefficient of determination R2 (square of correlation coefficient) in case of approximating to straight line is 0.98.

Figure 26:
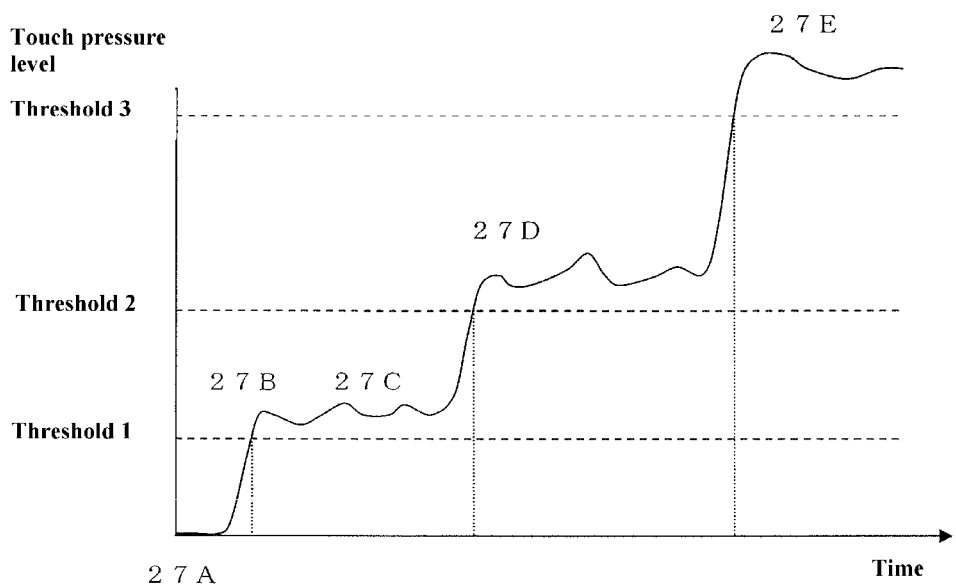
FIG. 26 is a view illustrating an example of relationship between time and strength of pressure at the time of selecting a function according to the strength of pressure in an example 1 of the present invention.

In this case, a configuration to select a function is applied according to the strength of touch pressure. With use of the touch pressure detection IC 310 in FIG. 3, it is possible to achieve the reaction according to the touch pressure by comparing strength of the measured touch pressure with a threshold memorized in the memory 303 of the touch pressure detection IC 310. The example of selecting function of software of a configuration memorizing the threshold to three-step touch pressure in the memory 303 is shown in FIG. 26 and FIG. 27. FIG. 26 shows a relation between time and touch pressure level and an example of three kinds of threshold (threshold 1, 2, and 3) memorized in the memory 303 and change of the touch pressure. FIG. 27 shows an example of the object representing on a display in each condition of 27A to 27D shown in FIG. 26.

Figure 27A:
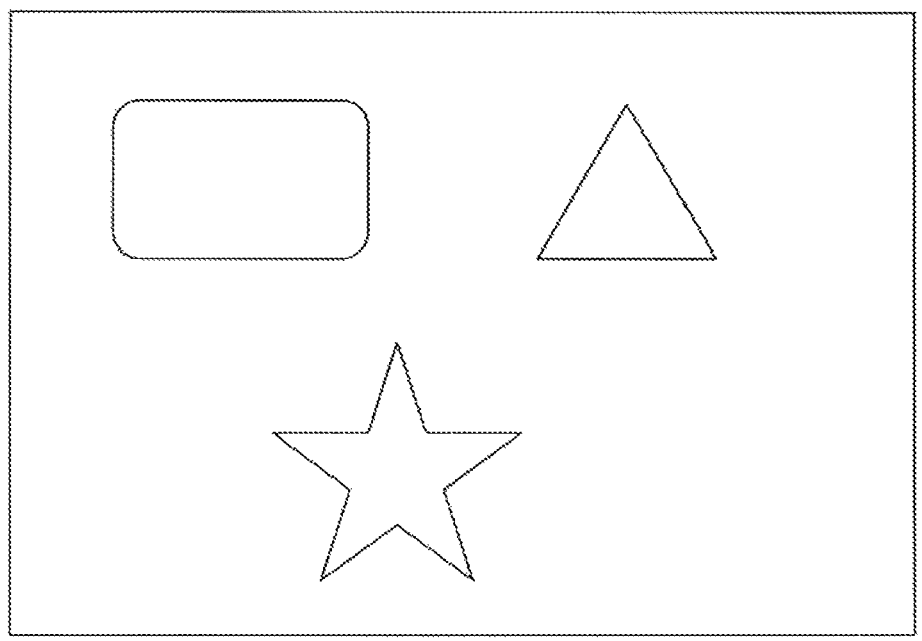
FIG. 27A is a view illustrating an example of transition of image indicating at the time of selecting a function in the example of the present invention.
Figure 27B:
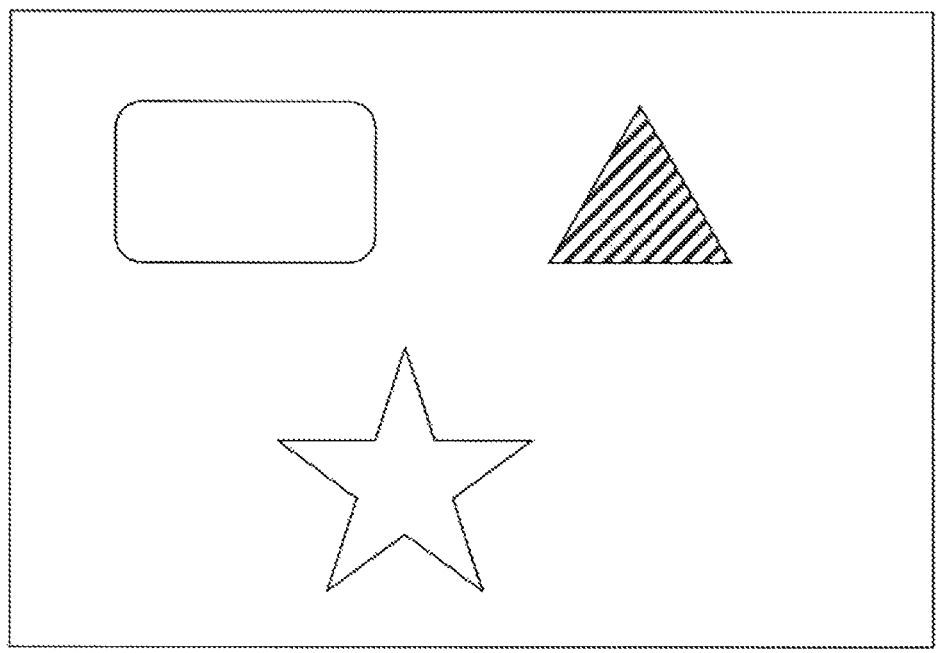
FIG. 27B is a view illustrating an example of transition of image indicating at the time of selecting a function in the example of the present invention.
Figure 27C:
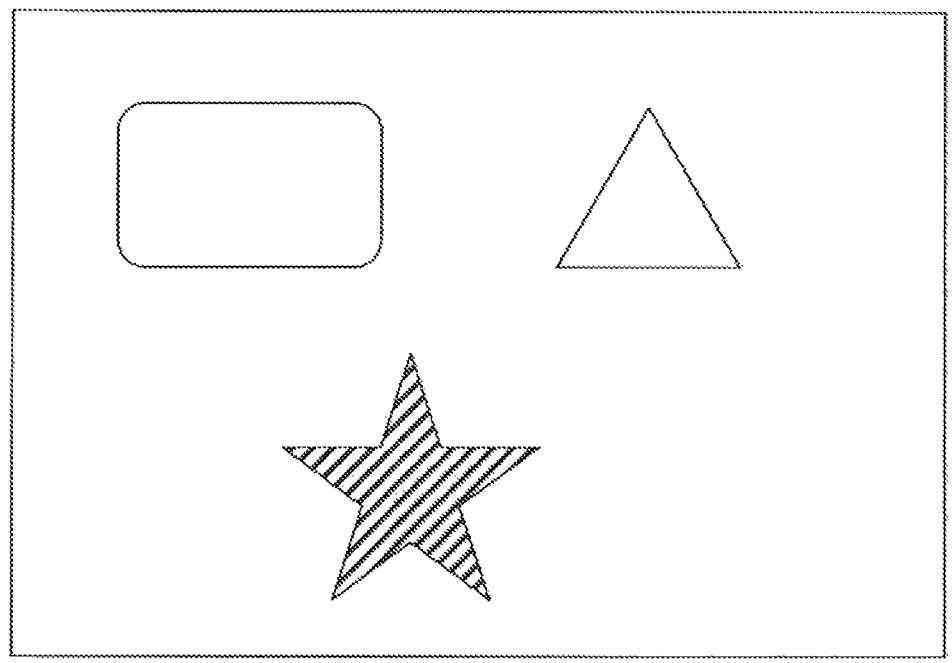
FIG. 27C is a view illustrating an example of transition of image indicating at the time of selecting a function in the example of the present invention.
Figure 27D:
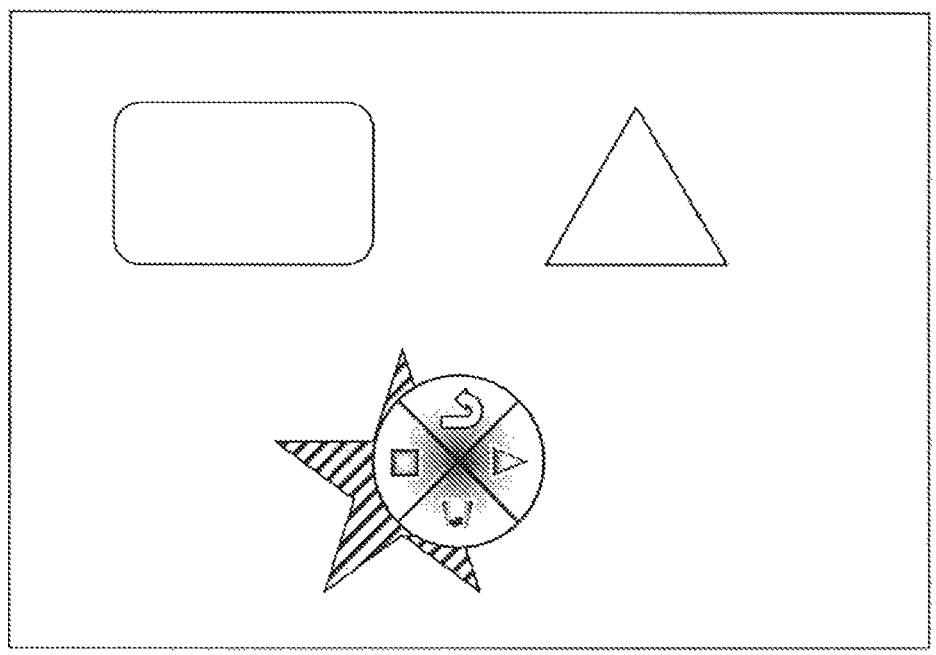
FIG. 27D is a view illustrating an example of transition of image indicating at the time of selecting a function in the example of the present invention.
Figure 27E:
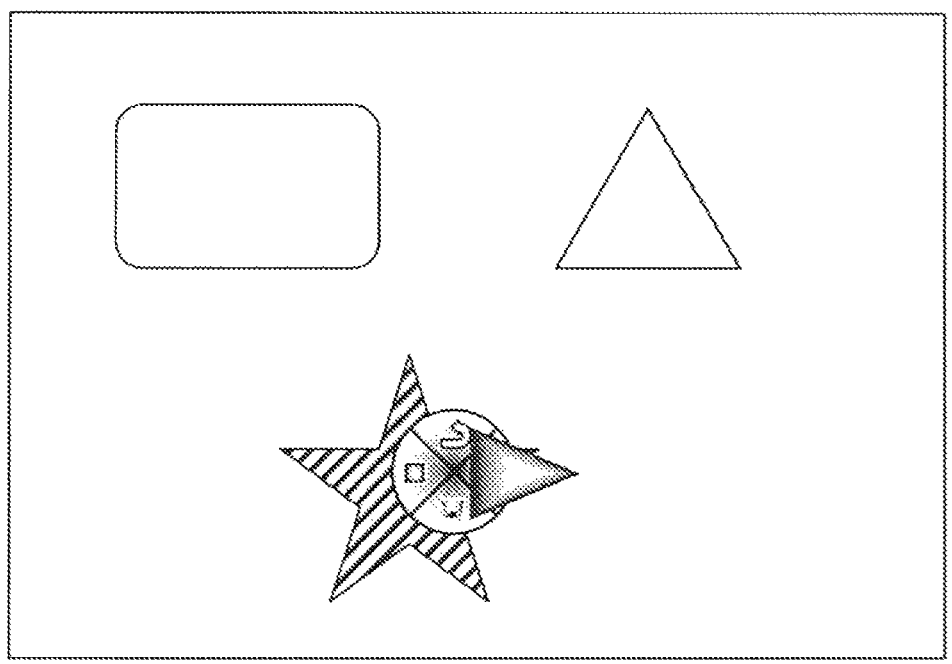
FIG. 27E is a view illustrating an example of transition of image indicating at the time of selecting a function in the example of the present invention.

In terms of a threshold 1 which is the lowest threshold level, it is considered that the touch is impossible to be detected less than or equal to this threshold. Consequently, the representation of display does not change as shown in FIG. 27A (27A in FIG. 26). When the touch pressure level is beyond this threshold 1, it is considered as generation of the touch to perform the surface selection (an indeterminate state as to selection during searching the touch position in spite of touching the surface). In this case, when the touch position on the display is changed keeping at the touch pressure level between threshold 1 and threshold 2, the displayed object to be selected is changed according to the touching position. Next, when the touch pressure level is beyond the threshold 2, it proceeds to the next function. This is a provisional selection (a state prepared for selecting the specified item of the menu). In the provisional selection, for example, as FIG. 27D (corresponding to 27D in FIG. 26), a menu corresponding to the selected object is displayed on the object. When the touch pressure increases beyond the threshold 3, it proceeds to the next function as a final determination (a state determining to select the specified item of the menu and the specified item of the attached sub-menu). In the final determination, for example, as FIG. 27E (corresponding to 27E in FIG. 26), one item in the menu corresponding to the selected object are selected and an operation corresponding to the menu is performed. In this way, it is possible in the operation that the function change is selected according to the memorized threshold of the touch pressure.

Although PVDF film is used as the piezoelectric layer 102 in this example, it is possible to obtain new characteristics by changing a composite material slightly. For example, it is possible to improve the transparency by making up polyvinylidene-tetrafluoroethylene copolymer. That is, it is composed by a copolymer of polyvinylidene expressed in (CH2-CF2)n and tetrafluoroethylene expressed in (CF2-CF2)n constituting Teflon (Registered Trademark). In case of copolymer of PVDF and trifluoroethylene, it is possible to obtain an appropriate piezoelectricity without stretching process. As these copolymer changes the characteristics obtained by mole ratio, the mole ratio is regulated according to the necessary characteristics.

Figure 28:
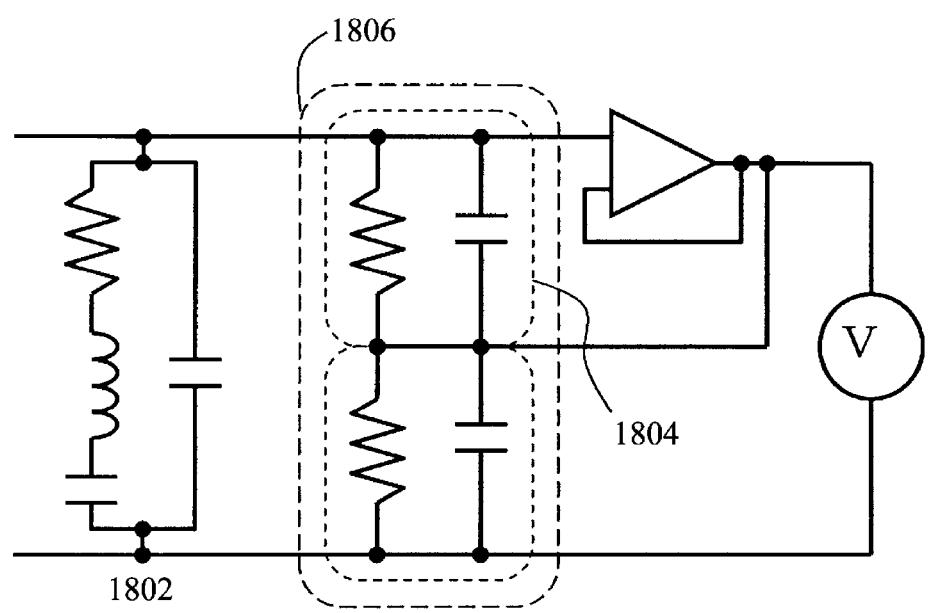
FIG. 28 is an example of a guard drive system possible to use in the example of the present invention.

Although it is configured to use the coaxial wiring in this example, it may be the following configuration with use of a tri-axial wiring as the coaxial wiring. This example is configured to use a tri-axial wiring and apply a guard-drive method, which is possible to ignore influences such as parasitic resistance and parasitic capacitance generating parallel to the wiring, to a detection part of voltage. FIG. 28 shows an example of equivalent circuit for the guard-drive method. The piezoelectric substance is provisionally shown by the equivalent circuit 1802. The electric potential, which is the same value as an output of amplifier of feedback structure for measuring voltage, is applied to the inside shield 1804. Consequently, as an input value and an output value are the same in electric potential, the resistance is infinite without generating the leak caused by the resistance of cable positioned in the input side of the amplifier. Then, the capacitance is considered as zero. This is configured to measure the electric potential generated by the touch pressure more exactly (shown by a sign of voltmeter). As a result, an accuracy of the measured result of the touch pressure is increased and feeble change comes to be exactly detected. An outside shield 1806 is provided around the inside shield 1804. The ground in all of the circuits is applied to the outside shield 1806.

Example 2

Although Example 2 is approximately the same configuration as Example 1, the use materials are greatly changed.

Materials in this embodiment, which are different from Example 1, are used as the piezoelectric layer 102. Specifically, laminating film made of polylactic acid is used. This laminating film made of polylactic acid is configured to laminate two kinds of films of poly L-lactic acid (PLLA), which has a relation of optical isomer, and poly D-lactic acid (PDLA)

The laminating film made of polylactic acid is configured to generate the piezoelectricity only by stretching. Hence, the poling process, which is necessary for PVDF film, is not required and the equipment, which is necessary for the poling process such as high voltage equipment, is not required. As the laminating film made of the polylactic acid has little or no power collection having in PVDF film, it does not change any characteristics and it is excellent in stability even in case of temperature change.

ATO (Antimony-addition tin oxide) is used as the transparent electrode in this embodiment. It may be more excellent in long-term reliability than ITO to be suitable for using this invention.

The sample made in this Example has revealed a preferable characteristics (slow deterioration start time etc.) under high-temperature and high-humidity bias test (temperature 60° C. and humidity 90%), compared with the sample in Example 1

Figure 29:
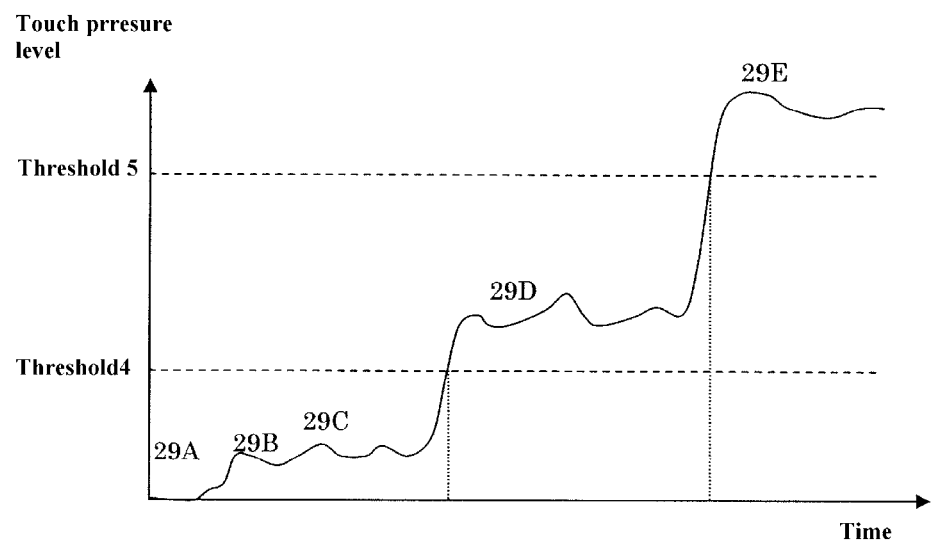
FIG. 29 is a view illustrating an example of relationship between time and strength of pressure at the time of selecting a function according to the strength of pressure in an example 2 of the present invention.

Moreover, the same function as selection of function according to touch pressure performed in Example 1 is achieved by both the touch and the touch pressure. FIG. 29 is a view showing a relation between time and touch pressure level to show an example of two kinds of threshold (threshold 4 and threshold 5) memorized in the memory 303 and a change of the touch pressure. In this Example, FIGS. of 27A to 27C are achieved by determining the touch position, not by the touch pressure, but by a function of the touch detection. A change of the touch pressure during the period thereof is shown, for example, in 29A to 29C of FIG. 29. When it is beyond the threshold 4 of the touch pressure as shown in 29D of FIG. 29, it becomes FIG. 27D as a function of provisional selection. That is, the threshold 4 in this Example is functionally equivalent to the threshold 2 in the Example 1 (although an actual level of the touch pressure is different, the function is the same). Furthermore, when it is beyond the threshold 5 of the touch pressure as shown in 29E of FIG. 29, it becomes FIG. 27E as a function of the final determination. That is, the threshold 5 in this Example is functionally equivalent to the threshold 3 in the Example 1 (although an actual level of the touch pressure is different, the function is the same).

In this way, the selection of function is controlled by two different detection values of the touch position detection and the touch pressure level. Consequently, kinds of the thresholds of the touch pressure can be reduced. Thus, even when an unstable way of pushing is performed, the selection of function with little malfunction can be achieved.

Example 3

AZO (aluminum-added zinc oxide) is also used as a material of the transparent electrodes in Example 3. This material is a material system using no rare elements and harmful elements. In particular, as aluminum and zinc is materials which exist abundantly on the earth and are easy to refine, there is no worry such as a rise of costs caused by exhaustion of materials.

By applying this material system, it is possible to obtain a piezoelectric sheet of this invention at lower costs.

Example 4

Example 4 of this invention shows an example of the touch panel with a function of tactile feedback, which is configured to use the piezoelectric sheet according to this invention.

This Example is a configuration of Example 4. This Example is configured to superpose the waveform as shown in FIG. 13 and the waveform superposed by the other tactile signals modulated around 20 Hz to sine wave applied to the first conductive layer. Then, the above superposed signals are applied to the second conductive layer. Consequently, it is possible to provide a feeling of pushing which is similar to mechanical click at the time of the touch and a feeling of roughness caused by the surface material of mechanical button. As a result, it is possible to provide a feeling of pushing a real button by providing such tactile feedback and a form of button represented in the display as well as a visual presentation of texture.

Figure 30:
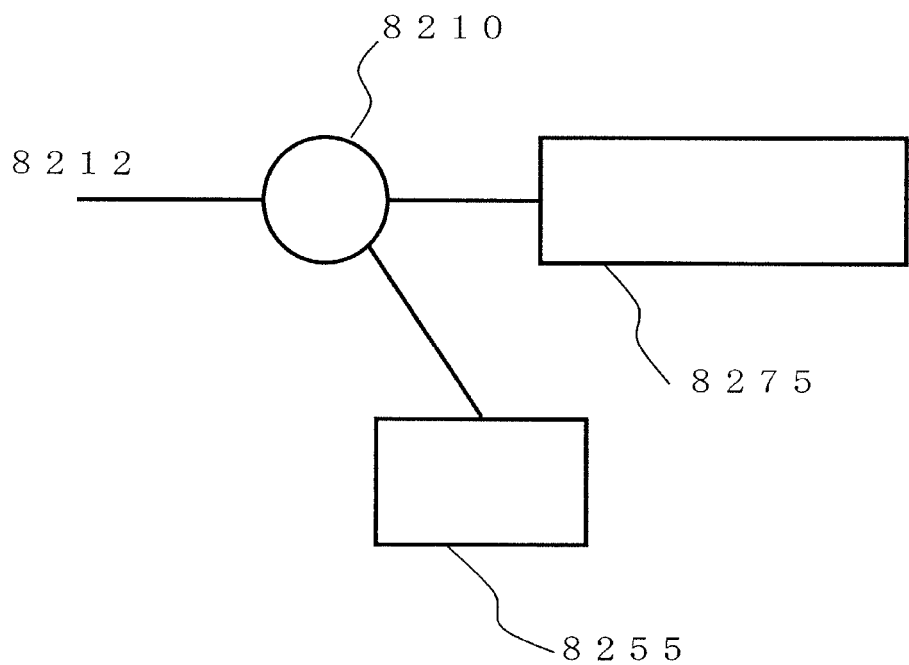
FIG. 30 is an example of block diagram of a circuit generating signals applying to the second conductive layer in an example 4 of the present invention.

As another signal waveform, it is configured to superpose waveform as shown in FIG. 13 and waveform superposed by the signals around 1 kHz to sine wave applied to the first conductive layer. Then, the above superposed signals are applied to the second conductive layer. Consequently, it is possible to express a feeling of mechanical click at the time of the touch and a different sound for each button. An example of a circuit used in this Example is shown in FIG. 30. A configuration of AC drive circuit in the position detection and coordinates detection IC connected to the first conductive layer is replaced by a circuit shown in FIG. 30. That is, it is applied to the first conductive layer by superposing an output of AC drive circuit 8275 and an output of the vibration signals generator 8255 to the superposing part 8210.

The vibration signals generator 8255 is configured to generate waveform as shown in FIG. 13. The second conductive layer is connected by a circuit shown in FIG. 12.

Example 5

Figure 31:
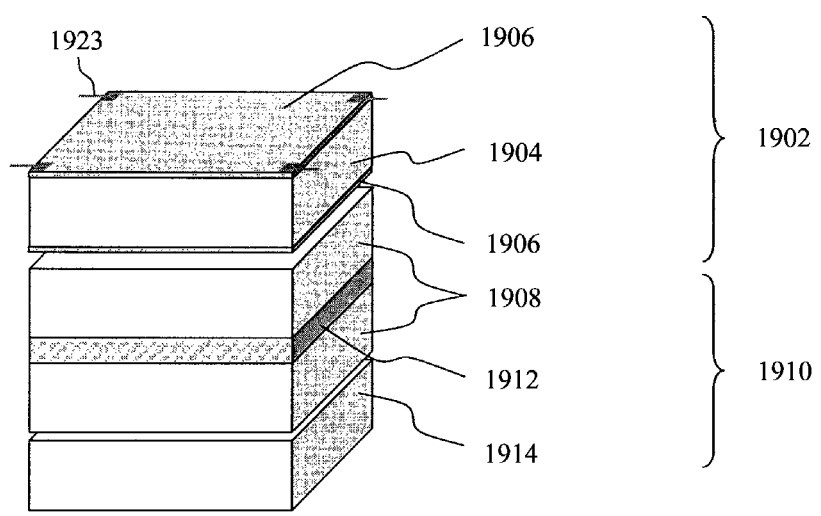
FIG. 31 is a perspective view illustrating a constitution of an example 5 of the present invention.

Example 5 of this invention shows an example of bending and torsion detection with use of a piezoelectric sheet 1902 of this invention. FIG. 31 shows a configuration of this Example.

In this Example, the conductive film is manufactured by forming conductive material made of PEDOT/PSS 1906 by screen printing at both ends of the PVDF film with 50 μm in thickness as treated with poling process. PEDOT/PSS 1906 is polymeric material, which is strong in mechanical change such as bending, compared with ITO and the like. Electrodes provided at four corners of the polymeric material PEDOT/PSS 1906 and wiring connection 1923 derived therefrom are shown.

The liquid-crystal display 1910 manufactured by sandwiching the liquid crystal 1912 with two sheets of flexible boards 1908 is disposed on a reverse surface of the above-manufactured piezoelectric sheet 1902. TFT of the liquid-crystal display 1910 is designed to maintain the flexibility by using the organic TFT. The backlight 1914 of the liquid-crystal display 1910 is designed to be the flexible backlight 1914 by using flexible optical guiding material and the like. In this configuration, a liquid-crystal display device integrated with the touch panel comprised of the liquid-crystal display 1910 and a piezoelectric sheet 1902 is formed. In this liquid-crystal display device integrated with the touch panel, the board and the like is made by flexible materials. Thus, it is easy to be transformed by bending or torsion.

Consequently, when this liquid-crystal display device is affected by bending and torsion, the bending and torsion is detected as signals by the bending and torsion. When the detected bending and torsion is set to have a specific meaning, it is possible to input signals the using bending and torsion. For example, when the whole portion is bent, it may be considered as the selection of enlargement or reduction of the whole display contents, or when the right end is bent, it may be considered as a determination of menu selection. Furthermore, when it generates torsion, it may be considered as a cancellation of all selections. Correspondence between the detected action and its meaning can be appropriately treated according to the purpose of the device application. In this configuration, when there is no keyboard or mouse, actions such as input can be operated not only by the touch panel, but also by the whole device's bending and torsion.

The sound generation mentioned in this sixth Example is examined as another application of this configuration. When the device is under bending, it is possible to make a larger sound compared with the sound of a not-bending flat condition by superposing signals corresponding to the frequency around 1 kHz. Consequently, a change with the bending can be expressed as a change in the sound volume.

Figure 32A:
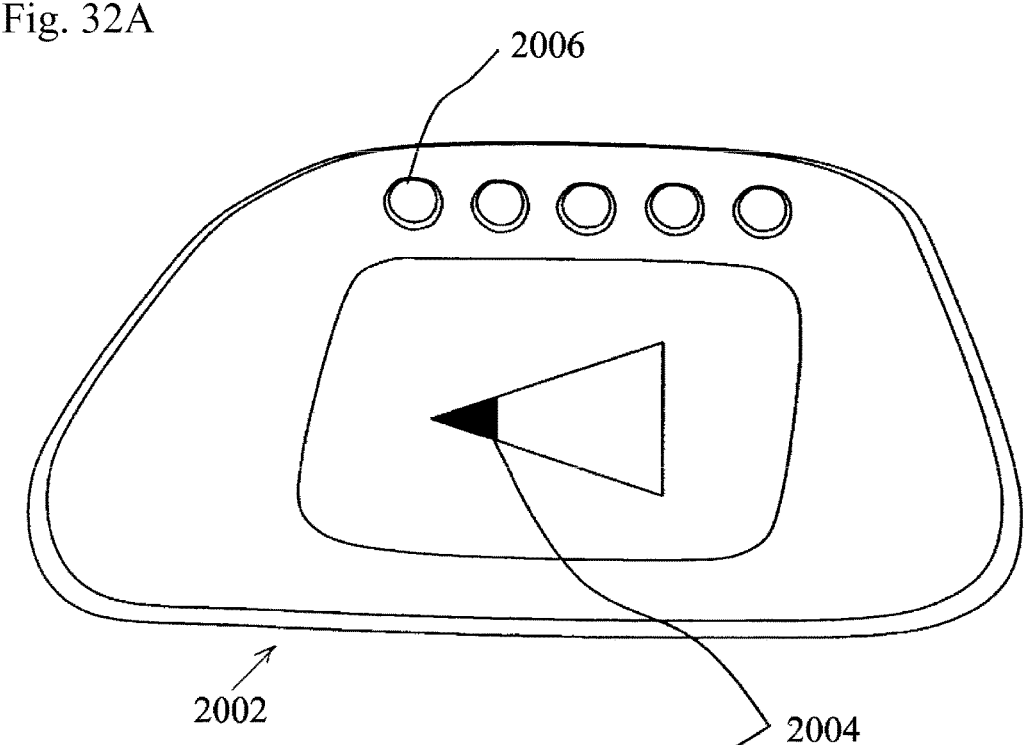
Figure 32B:
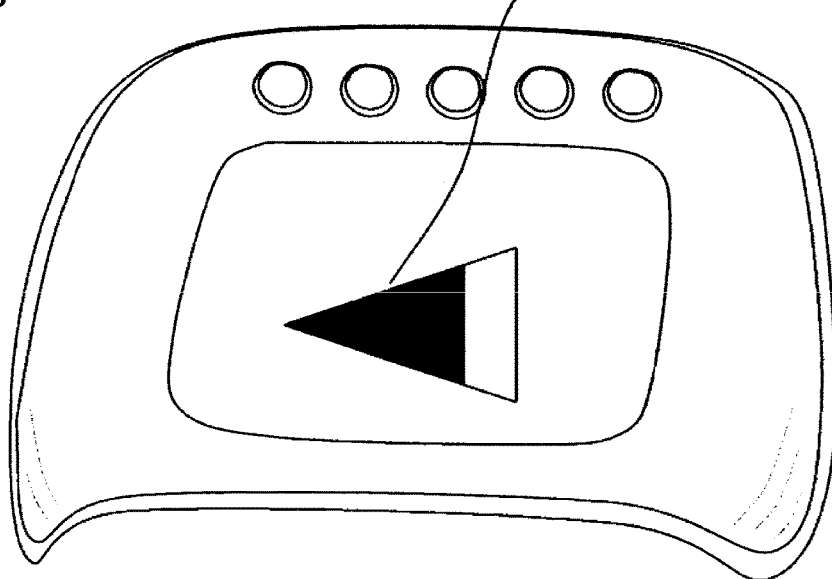

On the other hand, it is possible to provide an intellectual training toy 2002 for children with use of a change of sound volume by bending and stretching as another application. FIGS. 32A and 32B shows an example of this intellectual training toy. When sound is produced by a piezoelectric sheet, it is designed to utilize characteristics, by which sound remains small in a flat plane and sound becomes larger according to the bending as the strain is increased by bending. That is, although the superposed signals are constant, the sound volume is automatically enlarged by user's bending of the device to show a triangle icon on the display. It is designed to show a sound volume icon 2004 representing sound volume by the display area of the painted or filled icon (FIG. 32B).

As the sound volume is automatically decreased by making the device in a flat condition by user (FIG. 32A), an intellectual training toy like a musical instrument, which incorporates hand actions and changes of sound volume, can be realized.

Figure 33:
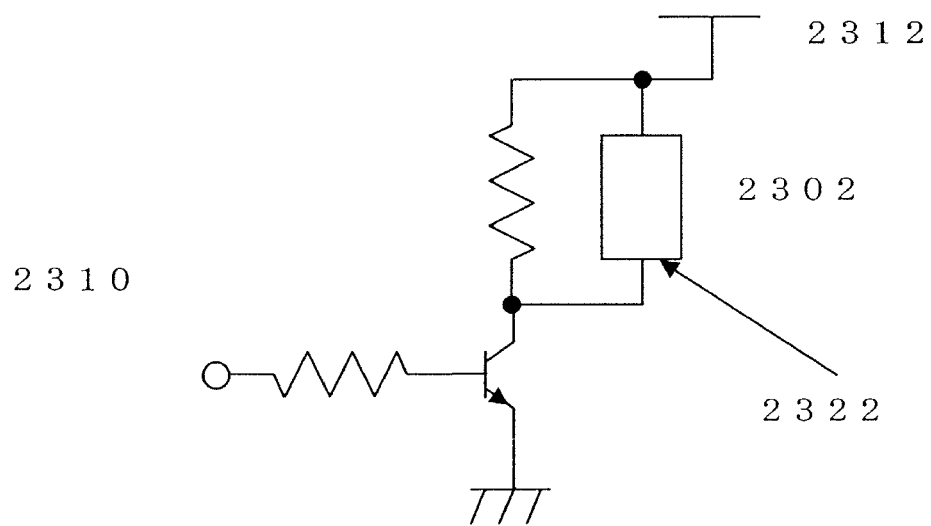
FIG. 33 is a circuit view illustrating an example of a circuit using at the time of generating sound.
Figure 34:
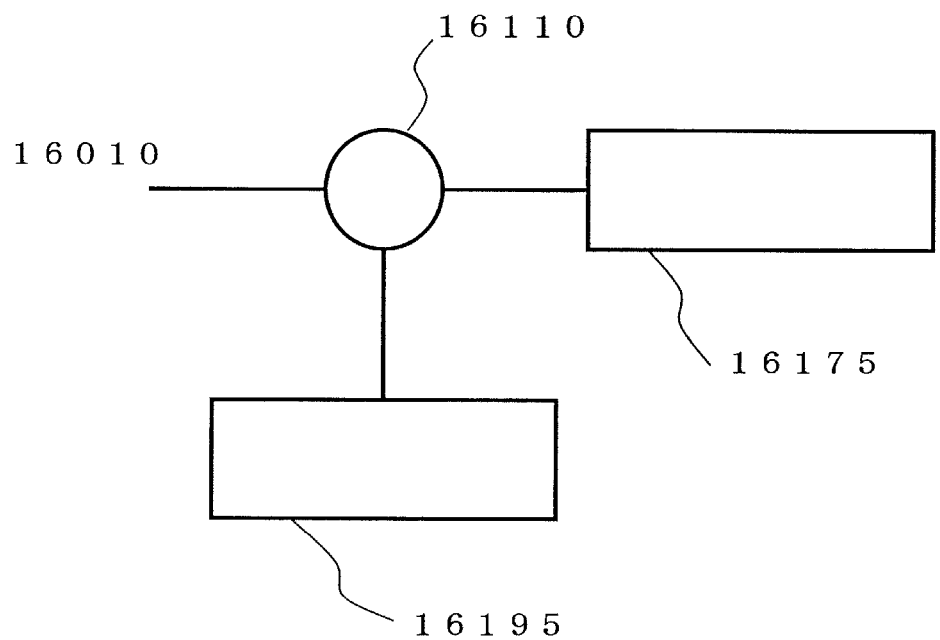
FIG. 34 is an example of block diagram of a circuit generating signals applying to the second conductive layer in the fifth example of the present invention.
Figure 35:
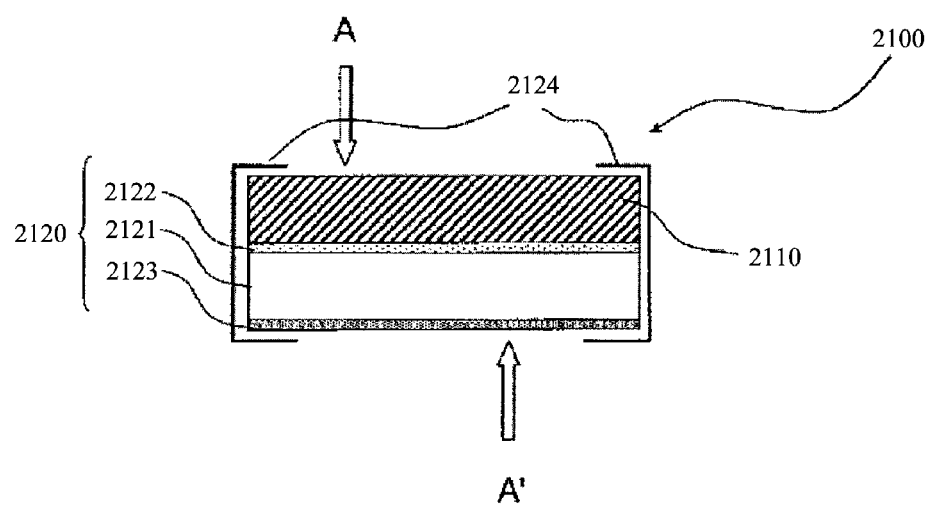
FIG. 35 is a section view illustrating a touch panel combining the conventional touch panel for position detection and a piezoelectric sheet.
Figure 36:
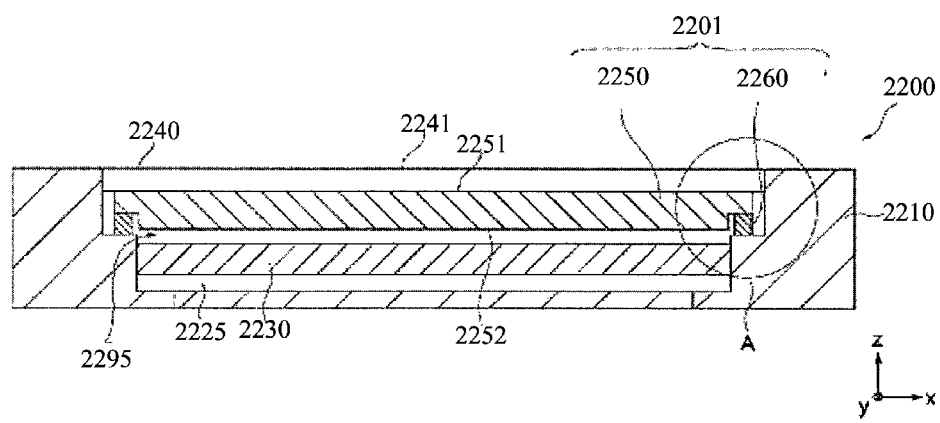
FIG. 36 is a section view illustrating a data processing device having a conventional sensor device.

In the generation of sound, it is understood that square wave as digital wave is audible like a larger sound than sine wave as analogue wave. Consequently, it is attained to make an end product like this Example to a low voltage by using the square wave for generation of sound and sufficient patience time can be obtained at one-time charge, reducing a size of battery by reducing the power consumption. An example of drive circuit used in generating sound at this time is shown in FIG. 33 and FIG. 34. In FIG. 34, the superposition part 16110 is configured to superpose an output of the AC drive circuit 16175 and an output of the square wave generator 16195 generating the acoustic generation signal by square wave to output to the acoustic generation signal input part in FIG. 33. In FIG. 33, signals sent from FIG. 34 are inputted from the acoustic generation signal input part through the first resistance to NPN transistor. The inputted signals are applied through NPN transistor to the second conductive layer 2322 of the piezoelectric sheet 2302 through the terminal 2310. On the other hand, the first conductive layer is designed to input signals to the first conductive layer through the terminal 2312.[K8] The second resistance is arranged parallel to this piezoelectric sheet 2302. A resistance value of the second resistance is set to a resistance value supporting charge and discharge of the piezoelectric sheet. It is possible to generate sound in the piezoelectric sheet by using such circuit configuration.

DESCRIPTION OF SYMBOLS

1 Data Processing Unit
10 touch panel 2210 of the resistive film or capacitive system
11 housing
20 transparent piezoelectric sheet
21 sheet-like transparent piezoelectric layer
22,23 transparent plate electrode
24 frame
25 backlight
30 liquid crystal panel
32,33 transparent sheet member
40 top plate
41 manipulandum contact surface
50 touch panel
51 input operation surface
52 second surface of touch panel
60 pressure sensor
95 gap
100 touch panel
101 sensor device
102, 602, 802, 1002, 1602, 1702 piezoelectric layer
112, 612, 812, 1012, 1612, 1712 first conductive layer
122, 622, 822, 1022, 1622, 1722 second conductive layer
1732 third conductive layer
142, 642, 842, 1042, 1642, 1742 insulating layers
201 current change detector
202 filtering and amplifier
203 noise eliminator
204 A/D converter
205 position coordinates calculator
206 final interface driver
207,2075,8075,8275,16075,16175 AC drive circuit
210, 2508 position detection—coordinates calculation IC
301 controller
302 pressure detector
303 memory
310, 2504 touch pressure detection IC
1623, 1624 wiring connection
2201,2202 second conductive layer
2071 DC drive circuit
2072 AC drive circuit
2077 high impedance switch
8010, 8255, 16155 vibration signal generation means
16085,16185 acoustic generation signals generation means
16195 square wave generator

What is claimed is:

1. A piezoelectric sheet comprising:
    an insulating layer;
    a first conductive layer disposed on the insulating layer;
    a piezoelectric layer disposed on the first conductive layer at a side thereof opposite the insulating layer; and
    a second conductive layer disposed on the piezoelectric layer at a side thereof opposite the first conductive layer,
    wherein the piezoelectric layer covers a surface of the second conductive layer, and
    wherein the piezoelectric sheet is configured to detect a touch position at the insulating layer by monitoring variations in an electrical signal applied to the first conductive layer while fixing the second conductive layer at a prescribed voltage or a prescribed waveform, and
    wherein the piezoelectric sheet is further configured to detect a touch pressure on the insulating layer by using both the piezoelectric layer and the second conductive layer in a time period different from a time period of detecting the touch position.

2. A piezoelectric sheet according to claim 1 further comprising:
    a third conductive layer disposed at a predetermined distance from the second conductive layer at a side thereof opposite the first conductive layer.

3. A piezoelectric sheet according to claim 1, further comprising a plurality of electrodes connected electrically to the first conductive layer to fetch the electrical signal including data concerning the touch position on a surface of the insulating layer through the plurality of the electrodes and calculate the touch position on the surface based on the electrical signal.

4. A touch panel comprising:
    the piezoelectric sheet according to claim 1,
    wherein the second conductive layer is formed by patterning in a plurality of stripes, a signal applying means for applying a signal detecting the touch position in the first conductive layer, and a measurement means for measuring voltage at both ends of each stripe from the stripes of the second conductive layer formed by the patterning.

5. An input-output device using a touch panel according to claim 4.

6. An input-output device according to claim 5, wherein the device has the piezoelectric sheet, a position detection and coordinates calculation IC connected to the piezoelectric sheet, and a touch pressure detection IC connected to the piezoelectric sheet.

7. An input-output device according to claim 5, wherein the device is configured to compare detected pressure with at least one memorized threshold and enable an operation according to the threshold.

8. An input-output device according to claim 5, wherein the device is configured to compare detected pressure with at least one memorized threshold and enable an operation according to the threshold and a detected touch position.

9. An input-output device comprising:
the piezoelectric sheet according to claim 1,
a signal applying means for applying a signal detecting the touch position, and
a second signal applying means for applying a signal superposing a vibration generation signal on the signal detecting the touch position to the second conductive layer.

10. An input-output device comprising:
the piezoelectric sheet according to claim 1,
a signal applying means for applying a signal detecting the touch position, and
an acoustic generation signal applying means for driving the piezoelectric layer and producing sound by applying a signal between the first conductive layer and the second conductive layer.

11. An input-output device using a piezoelectric sheet according to claim 1.

12. An input-output device according to claim 11, wherein the device has the piezoelectric sheet, a position detection and coordinates calculation IC connected to the piezoelectric sheet, and a touch pressure detection IC connected to the piezoelectric sheet.

13. An input-output device according to claim 11, wherein the device is configured to compare detected pressure with at least one memorized threshold and enable an operation according to the threshold.

14. An input-output device according to claim 11, wherein the device is configured to compare detected pressure with at least one memorized threshold and enable an operation according to the threshold and a detected touch position.

15. A piezoelectric sheet comprising:
an insulating layer;
a first conductive layer disposed on the insulating layer;
a piezoelectric layer disposed on the first conductive layer at a side thereof opposite the insulating layer;
a second conductive layer disposed on the piezoelectric layer at a side thereof opposite the first conductive layer; and
a third conductive layer spaced a non-zero distance from the second conductive layer at a side thereof opposite the first conductive layer and in a direction in which the insulating layer, the first conductive layer, the piezoelectric layer, and the second conductive layer are sequentially disposed,
wherein the piezoelectric layer covers a surface of the second conductive layer, and
wherein the piezoelectric sheet is configured to detect a touch position at the insulating layer by monitoring variations in an electrical signal applied to the first conductive layer while fixing the second conductive layer at a prescribed voltage or a prescribed waveform and to detect a touch pressure on the insulating layer by using both the piezoelectric layer and the first conductive layer.

16. A piezoelectric sheet according to claim 15, further comprising a plurality of electrodes connected electrically to the first conductive layer to fetch the electrical signal including data concerning the touch position on a surface of the insulating layer through the plurality of the electrodes and calculate the touch position on the surface based on the electrical signal.

17. An input-output device using a piezoelectric sheet according to claim 15.

18. An input-output device according to claim 17, wherein the device has the piezoelectric sheet, a position detection and coordinates calculation IC connected to the piezoelectric sheet, and a touch pressure detection IC connected to the piezoelectric sheet.

19. An input-output device according to claim 17, wherein the device is configured to compare detected pressure with at least one memorized threshold and enable an operation according to the threshold.

20. An input-output device according to claim 17, wherein the device is configured to compare detected pressure with at least one memorized threshold and enable an operation according to the threshold and a detected touch position.

* * * * *